US012185761B2

(12) United States Patent
Lau et al.

(10) Patent No.: US 12,185,761 B2
(45) **Date of Patent: *Jan. 7, 2025**

(54) METHOD OF MAKING E-VAPING DEVICE WITH EJECTORS TO EJECT DROPLETS

(71) Applicant: Altria Client Services LLC, Richmond, VA (US)

(72) Inventors: Raymond Lau, Richmond, VA (US); Eric Hawes, Midlothian, VA (US); Terry Bache, Richmond, VA (US); Ryan Newcomb, Powhatan, VA (US); John Glenn Edelen, Richmond, VA (US); James D. Anderson, Jr., Richmond, VA (US); Byron Bell, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 959 days.

This patent is subject to a terminal disclaimer.

(21) Appl. No.: 17/212,310

(22) Filed: Mar. 25, 2021

(65) Prior Publication Data

US 2021/0204607 A1 Jul. 8, 2021

Related U.S. Application Data

(62) Division of application No. 16/395,949, filed on Apr. 26, 2019, now Pat. No. 10,959,462, which is a (Continued)

(51) Int. Cl.
*A24F 40/48* (2020.01)
*A24F 40/50* (2020.01)
(Continued)

(52) U.S. Cl.
CPC .............. *A24F 40/48* (2020.01); *A24F 40/50* (2020.01); *H05B 3/46* (2013.01); *A24F 40/10* (2020.01)

(58) Field of Classification Search
None
See application file for complete search history.

(56) References Cited

U.S. PATENT DOCUMENTS

| | | | |
|---|---|---|---|
| 5,666,977 | A | 9/1997 | Higgins et al. |
| 6,804,458 | B2 | 10/2004 | Sherwood et al. |

(Continued)

FOREIGN PATENT DOCUMENTS

| | | | |
|---|---|---|---|
| CN | 1196660 | A | 10/1998 |
| CN | 105848504 | A | 8/2016 |

(Continued)

OTHER PUBLICATIONS

Maurya et al., "An Analytical Model of a Silicon MEMS Vaporizing Liquid Microthruster and Some Experimental Studies", Sensors and Actuators A, vol. 122, pp. 159-166, 2005.

(Continued)

*Primary Examiner* — James Harvey
(74) *Attorney, Agent, or Firm* — Harness, Dickey & Pierce, P.L.C.

(57) ABSTRACT

The e-vaping method includes providing a reservoir within a housing, the reservoir being configured to contain a pre-vapor formulation, first configuring ejectors to eject droplets of the pre-vapor formulation towards a vaporizing heater, the ejectors being in fluid communication with the reservoir, and second configuring a vaporizing heater to vaporize at least some of the droplets.

20 Claims, 18 Drawing Sheets

SECTION III - III

Related U.S. Application Data division of application No. 15/789,245, filed on Oct. 20, 2017, now Pat. No. 10,314,342.

(51) Int. Cl.

| | |
|---|---|
| ***H05B 3/46*** | (2006.01) |
| *A24F 40/10* | (2020.01) |

(56) References Cited

U.S. PATENT DOCUMENTS

| | | | | |
|---|---|---|---|---|
| 6,902,867 | B2 | 6/2005 | Hall et al. | |
| 6,951,384 | B2 | 10/2005 | Anderson et al. | |
| 7,041,226 | B2 | 5/2006 | Vaideeswaran et al. | |
| 7,080,896 | B2 | 7/2006 | Bell et al. | |
| 7,165,831 | B2 | 1/2007 | Cornell et al. | |
| 7,364,268 | B2 | 4/2008 | Hart et al. | |
| 7,756,404 | B2 | 7/2010 | Schubert et al. | |
| 7,954,926 | B2 | 6/2011 | Bertelsen et al. | |
| 8,109,608 | B2 | 2/2012 | Fannin et al. | |
| 8,292,402 | B2 | 10/2012 | Weaver et al. | |
| 9,072,321 | B2 | 7/2015 | Liu | |
| 9,168,555 | B2 | 10/2015 | Tsai et al. | |
| 9,339,062 | B2 | 5/2016 | Hon | |
| 9,968,136 | B1 | 5/2018 | Bell | |
| 9,993,027 | B1 | 6/2018 | Bell | |
| 10,314,342 | B2 | 6/2019 | Lau et al. | |
| 10,524,510 | B2 | 1/2020 | Bell | |
| 2005/0016550 | A1 | 1/2005 | Katase | |
| 2014/0165999 | A1 | 6/2014 | Maharajh et al. | |
| 2014/0283855 | A1 | 9/2014 | Hawes et al. | |
| 2014/0334802 | A1 | 11/2014 | Dubief | |
| 2015/0027459 | A1 | 1/2015 | Collett et al. | |
| 2015/0114409 | A1 | 4/2015 | Brammer et al. | |
| 2015/0266040 | A1 | 9/2015 | Miller et al. | |
| 2015/0305410 | A1 | 10/2015 | Liu | |
| 2016/0007653 | A1 | 1/2016 | Tu | |
| 2017/0208864 | A1 | 7/2017 | Anderson, Jr. et al. | |
| 2018/0116281 | A1 | 5/2018 | Anderson, Jr. | |
| 2018/0153215 | A1 | 6/2018 | Bell | |
| 2018/0255831 | A1 | 9/2018 | Lipowicz et al. | |
| 2018/0280233 | A1 | 10/2018 | Aragon | |
| 2019/0116880 | A1 | 4/2019 | Lau et al. | |
| 2019/0246702 | A1 | 8/2019 | Lau et al. | |
| 2020/0120758 | A1 | 4/2020 | Bell et al. | |
| 2020/0205478 | A1 | 7/2020 | Dick et al. | |
| 2021/0204607 | A1* | 7/2021 | Lau .......................... | H05B 3/46 |

FOREIGN PATENT DOCUMENTS

| | | | |
|---|---|---|---|
| CN | 106455683 | A | 2/2017 |
| CN | 106686995 | A | 5/2017 |
| EP | 0845220 | A1 | 6/1998 |
| EP | 3332657 | A1 | 6/2018 |
| JP | 2005/034021 | A | 2/2005 |
| JP | 2016/538844 | A | 12/2016 |
| JP | 2017/526494 | A | 9/2017 |
| JP | 2019/508021 | A | 3/2019 |
| JP | 2019/513012 | A | 5/2019 |
| KR | 2016/0097196 | A | 8/2016 |
| WO | WO-97/048293 | A1 | 12/1997 |
| WO | WO-2015/066127 | A1 | 5/2015 |
| WO | WO-2015/117705 | A2 | 8/2015 |
| WO | WO-2015/195992 | A1 | 12/2015 |
| WO | WO-2016/059003 | A2 | 4/2016 |
| WO | WO-2017/125846 | A1 | 7/2017 |
| WO | WO-2017/153270 | A1 | 9/2017 |

OTHER PUBLICATIONS

International Search Report and Written Opinion issued Apr. 8, 2019 in corresponding PCT/EP2018/078744.
Written Opinion issued Sep. 11, 2019 in PCT Application PCT/EP2018/078744.
International Preliminary Report on Patentability dated Jan. 24, 2020, issued in corresponding International Application No. PCT/EP2018/078744.
Office Action dated Jul. 13, 2023, issued in corresponding Korean Patent Application No. 10-2020-7013509.
Office Action dated Nov. 16, 2022 issued in related Japanese patent application No. 2020-521341.
Russian Decision to Grant dated Apr. 1, 2022, issued in corresponding Russian Patent Application No. 2020113351.
European Communication dated Aug. 25, 2021, issued in corresponding European Patent Application No. 18796378.0.
Russian Office Action and Search Report dated Nov. 17, 2021, issued in corresponding Russian Patent Application No. 2020113351.
Office Action dated Sep. 20, 2022, issued in corresponding Brazilian Patent Application No. 1120200073857.
Chinese Office Action, dated Sep. 6, 2023, issued in corresponding Chinese Patent Application No. 201880062964.5.
Brazilian Office Action, dated Jun. 4, 2024, issued in Brazilian Patent Application No. BR112020007385-7.

* cited by examiner

SECTION III - III

SECTION X - X

METHOD OF MAKING E-VAPING DEVICE WITH EJECTORS TO EJECT DROPLETS

CROSS-REFERENCE TO RELATED APPLICATIONS

This is a divisional of U.S. application Ser. No. 16/395,949, filed on Apr. 26, 2019, which is a divisional of U.S. application Ser. No. 15/789,245, filed on Oct. 20, 2017, the disclosures of each of which are hereby incorporated by reference in their entirety.

BACKGROUND

Field

Example embodiments relate generally to an electronic vaping (e-vaping) device using the jet dispensing cartridge.

Related Art

Electronic vaping (e-vaping) devices are generally used to heat and vaporize a pre-vapor formulation. These devices often rely on a wick to transport the pre-vapor formulation from a reservoir to a heater, where the heater may heat and subsequently vaporize the pre-vapor formulation that may become entrained in an air flow within the device.

SUMMARY

At least one example embodiment relates to an e-vaping device.

In one embodiment, the e-vaping device includes a device housing; a vaporizing heater within the device housing; a cartridge within the device housing, the cartridge defining a reservoir configured to contain a pre-vapor formulation; and a chip on a first end of the cartridge, the chip defining at least one via in fluid communication with the reservoir, the chip including at least one first ejector, the at least one first ejector being in fluid communication with the at least one via, the at least one first ejector being configured to eject droplets of the pre-vapor formulation towards the vaporizing heater, the vaporizing heater being configured to vaporize the droplets of the pre-vapor formulation.

In one embodiment, the e-vaping device further includes at least one substrate heater on the chip, the at least one substrate heater being configured to heat the chip; a power supply; and control circuitry electrically connected to the power supply, the control circuitry being configured to control a supply of power from the power supply to the at least one first ejector, the vaporizing heater and the at least one substrate heater in order to, energize the vaporizing heater, energize the at least one substrate heater to heat the chip to a first temperature, and energize the at least one first ejector to eject the droplets of the pre-vapor formulation toward the vaporizing heater, once the chip reaches the first temperature.

In one embodiment, the control circuitry is further configured to, first heat the vaporizing heater to a second temperature, the second temperature being a pre-heat temperature of about 100-200° C., and second heat the vaporizing heater to the third temperature, the third temperature being a target jetting temperature of about 200-400° C., the energizing of the at least one first ejector being accomplished once the chip reaches the first temperature and the vaporizing heater reaches the third temperature.

In one embodiment, the cartridge is removable from the device housing.

In one embodiment, the at least one first ejector includes a plurality of ejectors in a matrix positioned adjacent to the at least one via, each of the plurality of ejectors including, a nozzle defined by a surface on the chip, a chamber structure in fluid communication with the nozzle and the at least one via, an ejection heater on a surface of the chamber, the ejection heater being configured to heat and partially vaporize the pre-vapor formulation to form the droplets that are ejected through the nozzle and towards the vaporizing heater.

In one embodiment, the plurality of ejectors are configured to eject the droplets of the pre-vapor formulation with a droplet size that is about 25 to 29 μm in diameter, and the device is configured to produce vapor at a production rate of about 6 to 16 mg per puff for a puff duration of about 5 seconds with a vapor particle size of about 0.4 to 5 μm in diameter.

In one embodiment, the at least one via includes a first via and a second via defined by the chip.

In one embodiment, the pre-vapor formulation has a viscosity of about 40 cP to 100 cP, and the first temperature is about 50 to 80° C.

In one embodiment, the cartridge further includes, a cartridge housing; a protrusion within the cartridge housing, the protrusion defining a channel; a substrate holding the chip on the first end of the cartridge, the substrate abutting the channel; and a porous structure within the reservoir, the porous structure configured to retain the pre-vapor formulation.

In one embodiment, the chip is separable from the first end of the cartridge, and the device is structured to retain the chip if the cartridge is removed from the device housing.

In one embodiment, the e-vaping device further includes tongs within the device housing, the tongs configured to grasp an end of the vaporizing heater to suspend the vaporizing heater near the at least one first ejector, the at least one first ejector configured to eject the droplets of the pre-vapor formulation at or across the vaporizing heater.

At least another example embodiment relates to a method of operating an e-vaping device.

In one embodiment, the method of operating the e-vaping device includes providing an e-vaping device including, a vaporizing heater within a first housing, a cartridge within the first housing, the cartridge defining a reservoir configured to contain a pre-vapor formulation, a chip on a first end of the cartridge, the chip including at least one first ejector, at least one via within the chip, the at least one via being in fluid communication with a reservoir, the at least one first ejector being in fluid communication with the at least one via, a power supply electrically connected to the at least one first ejector and the vaporizing heater; supplying a first electrical current from the power supply to the vaporizing heater to energize the vaporizing heater; and supplying a second electrical current from the power supply to the at least one first ejector to energize the at least one first ejector and eject droplets of the pre-vapor formulation from the at least one first ejector towards the vaporizing heater.

In one embodiment, the providing includes providing the e-vaping device such that the e-vaping device includes at least one substrate heater connected to the chip, the method further including supplying a third electrical current from the power supply to the at least one substrate heater to energize the at least one substrate heater and heat the chip to a first temperature, the third electrical current being supplied after the first electrical current is supplied.

In one embodiment, the supplying of the second electrical current occurs once the chip reaches the first temperature.

In one embodiment, the supplying of the first electrical current to the vaporizing heater energizes the vaporizing heater to a second temperature, the second temperature being a preheat temperature of about 100-200° C., where the method further includes supplying a fourth electrical current from the power supply to the vaporizing heater to energize the vaporizing heater to a third temperature, the third temperature being about 200-400° C., the fourth electrical current being supplied following the vaporizing heater reaching the second temperature, wherein the supplying of the second electrical current occurs once the chip reaches the first temperature and the vaporizing heater reaches the third temperature, the first temperature being about 50 to 80° C.

DETAILED DESCRIPTION

Figure 1:
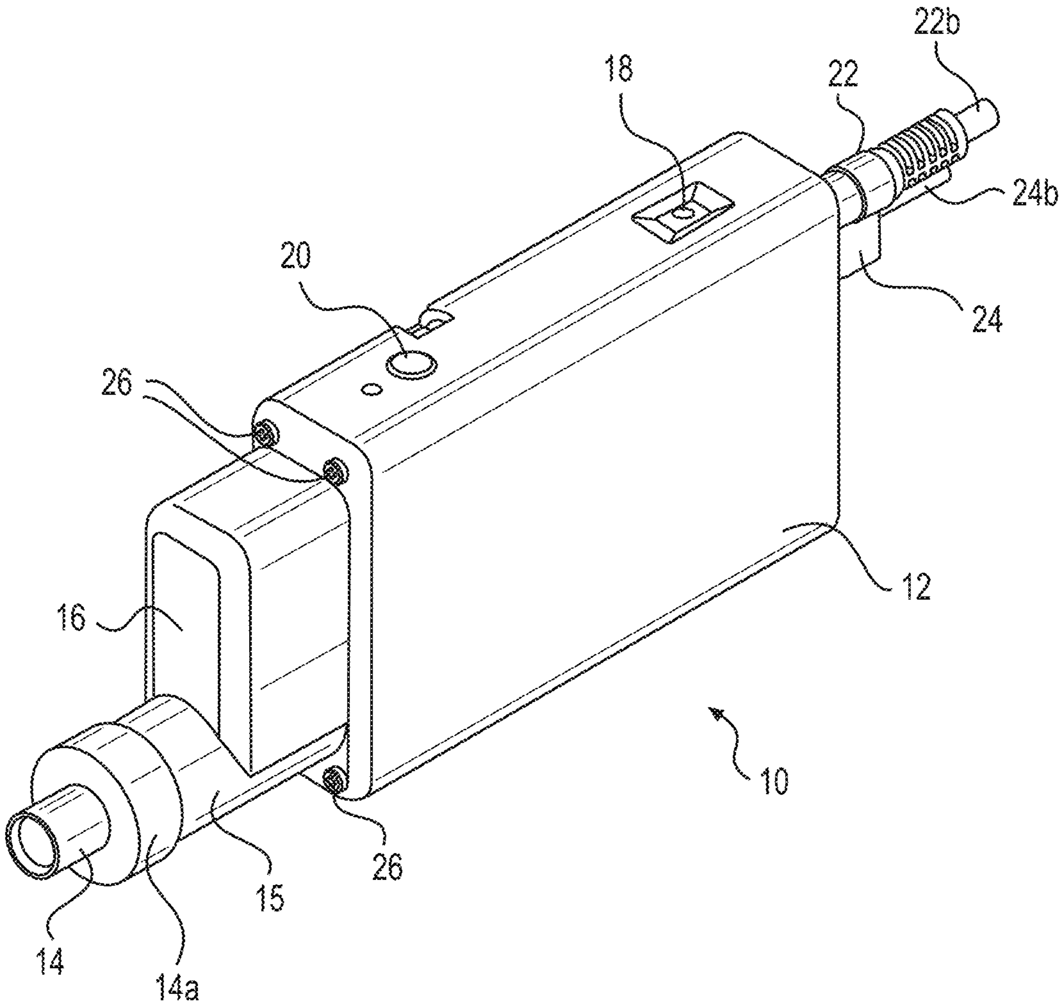
FIG. 1 is an illustration of a perspective view of an e-vaping device with a jet dispensing cartridge, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

General Methodology

Example embodiments utilize jet dispensing that may precisely control and uniformly distribute high-velocity droplets of a pre-vapor formulation onto a heating element, in order to accurately control vapor generation within an e-vaping device. Use of jet dispensing, in combination with a temperature controlled heating element, which is synchronized with timing of the jet dispensing, that may offer several benefits that include: 1) efficient communication of the pre-vapor formulation within the e-vaping device, 2) precise pre-vapor formulation jetting for consistent vapor generation, 3) improved detection of a 'low pre-vapor formulation level,' 4) elimination of contact between the pre-vapor formulation and the heating element during storage and non-use of the e-vaping device, 5) allow for the use of a textured heating surface of the heating element in order to reduce splattering of the pre-vapor formulation (which further controls the accuracy of vapor generation within the device), 6) allow for the use of a replaceable cartridge that is easily separated from the e-vaping device, and 7) allow for the use of a high-viscosity, high-density pre-vapor formulation, which may require a low volumetric quantity of pre-vapor formulation relative to a quantity of vapor that is generated by the e-vaping device.

Example Structural Embodiments

FIG. 1 is an illustration of a perspective view of an e-vaping device 10 with a jet dispensing cartridge 30 (see FIG. 3), in accordance with an example embodiment. The device 10 includes a housing 12. On a side of the housing 12, a power switch 18 may be included, where the power switch 18 is capable of turning the device on and off (as described below in more detail). A heat activation switch 20 may also be included on the housing 12.

Figure 3:
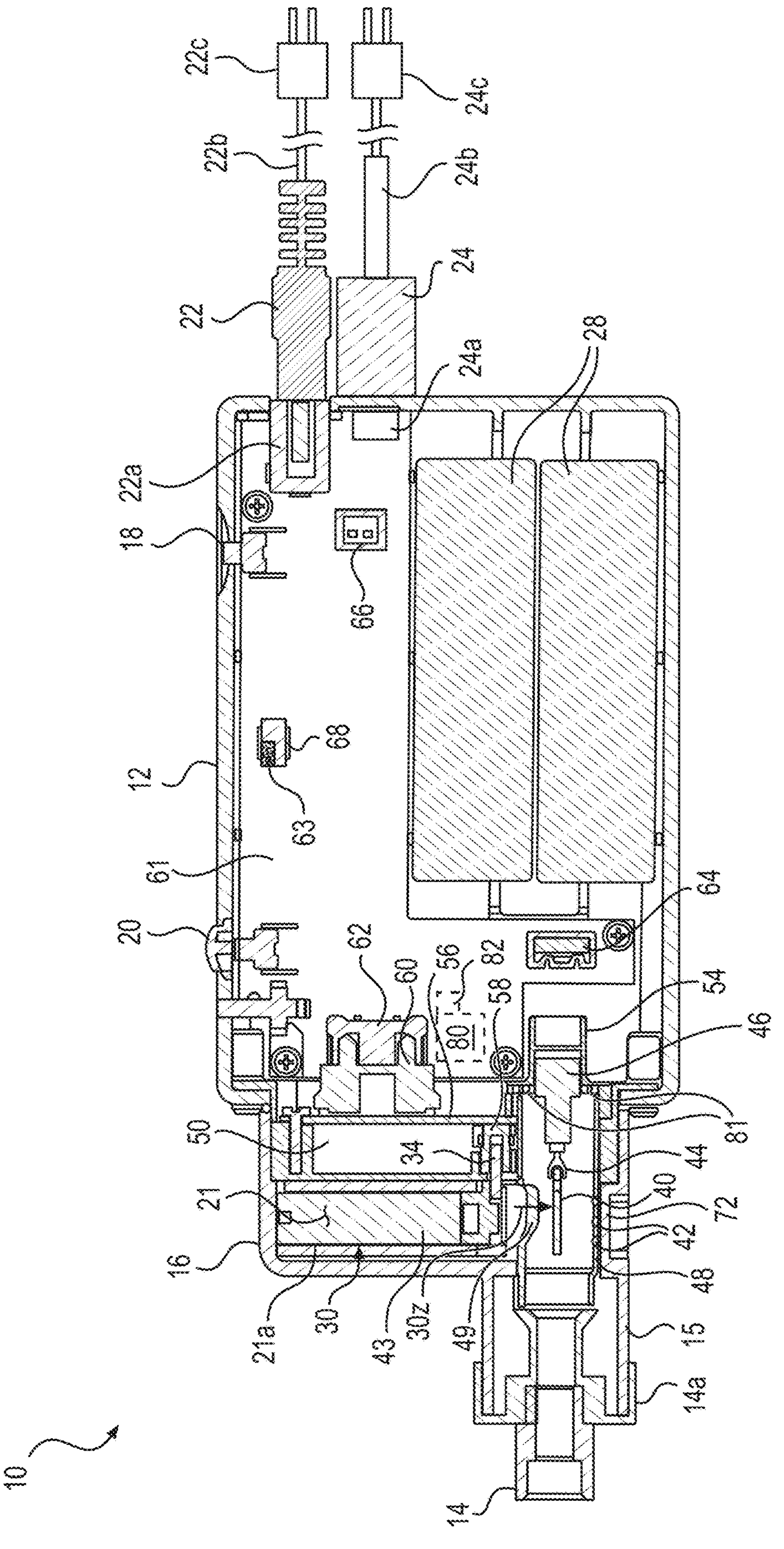
FIG. 3 is an illustration of a cross-sectional view of the e-vaping device of FIG. 1, in accordance with an example embodiment.

The device 10 includes a cartridge housing 16, where the housing 16 may cover the cartridge 30 (see FIG. 3). A stack 15 emanates from the cartridge housing 16. A mouthpiece 14 may be connectable to the housing stack 15, where a base 14*a* of the mouthpiece 14 fits onto the stack 15 via friction-fitting (or alternatively, the base 14*a* fits onto the stack 15 via threads, a snap-fit connection, a bayonet-style connection, or other comparable structure). The cartridge housing 16 is connected to the device housing 12 via mounting screws 26, or alternatively, the cartridge housing 16 may be connected to the device housing 12 via other structure (such as friction-fitting, a snap-fit connection, etc.). In an embodiment, the cartridge housing 16 may be easily removable from the main housing 12 of the device 10 in order to access a location of the cartridge 30 (described below in more detail).

A power supply connector 22 and/or a universal serial bus (USB) connector 24 may be removably connectable to the back of the device 10 (shown in better detail in FIG. 3, and described below).

Figure 2:
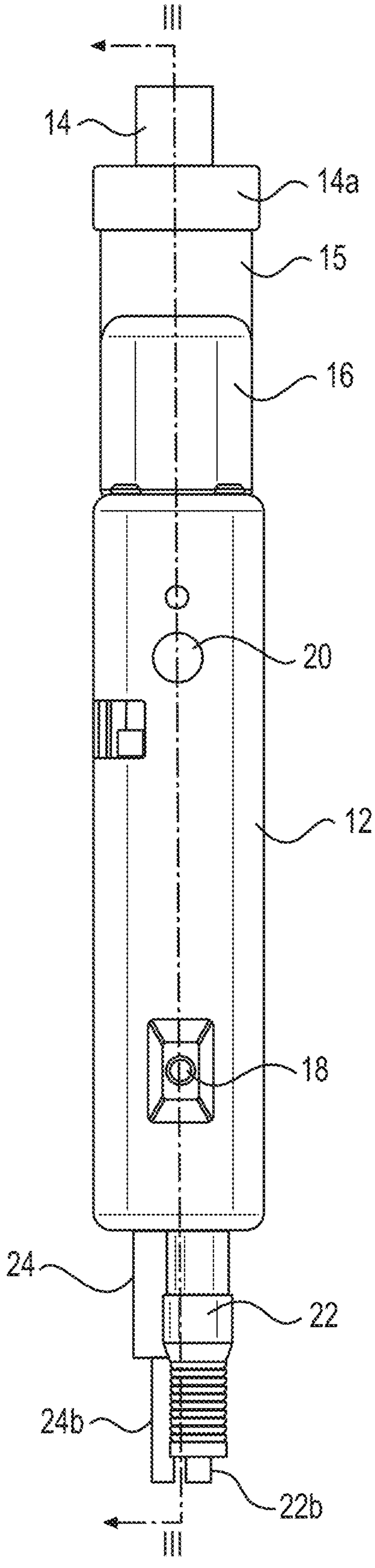
FIG. 2 is an illustration of a top-view of the e-vaping device of FIG. 1, in accordance with an example embodiment.

FIG. 2 is an illustration of a top-view of the e-vaping device 10 of FIG. 1, in accordance with an example embodiment. A cross-sectional view of the device 10, along line III-III, is illustrated in FIG. 3 (described below).

FIG. 3 is an illustration of a cross-sectional view (along line III-III of FIG. 2) of the e-vaping device 10 of FIG. 1, in accordance with an example embodiment. The cartridge 30, holding a foam inner-insert 43 containing a pre-vapor formulation 21, resides in the cartridge housing 16. As described below in more detail (especially in relation to FIGS. 4-13), in an embodiment the cartridge 30 is a jet dispensing cartridge. Specifically, the jet dispending cartridge 30 is capable of discharging droplets of the pre-vapor formulation 21, in a discharge direction 30*z* through an orifice 49 onto an upper surface of a heater 40 contained within a heater housing (chimney) 48, so that the pre-vapor formulation 21 is evenly distributed and heated on the surface of the heating element (heater) 40 of the device 10. Vent holes 42 are positioned on a lower surface of the heater housing 48, where the vent holes 42 allow ambient air to enter the device 10, and mix with a vaporized pre-vapor formulation that is generated within the heater housing 48 by the heater 40. In an embodiment, the heater 40 may have major surfaces (i.e., a top and bottom surface) may be respectively about perpendicular to an expected direction of the pre-vapor formulation 21 being ejected from the cartridge 30, and about perpendicular to an expected direction of airflow entering the device 10 from the vents 42. An airflow cover 72 may cover the vent holes 42. The airflow cover 72 may be manually slideable along a bottom of the device 10, in order to expose the vent holes 42 during periods of time when the device 10 requires ambient air to enter the heater housing 48, in order to enable the heater 40 to vaporize the pre-vapor formulation 21. The heater 40 is referred to as a "vaporizing heater" within this document.

The heater 40 is held in place (between the orifice 49 and the vent holes 42 within the heater housing 48) via heater tongs 44, where the tongs 44 help electrically connect the heater 40 to the heater power connector 64. In particular, the tongs 44 emanate from a heater holder 46, where an electrically-conductive heater connector 54 electrically connects the tongs 44 of the heater holder 46 to the heater power connector 64. In an embodiment, the tongs 44 grasp only an end of the heater 40, in order to suspend all surfaces of the heater 40 (other than the contact surface of the heater 40 touching the tongs 44) within an open space defined by the chimney 48. The electrodes 28*a* of the power supply 28 (shown in FIG. 14) electrically connect to the heater power connector 64, where the heater power connector 64 is electrically connected to the heater connector 54.

The power supply connector 22 may be removably connectable to the back of the device 10, in order to provide a source of electrical power to a printed circuit board (PCB) 61 of the device 10, where a microcontroller (MCU) 63 and/or a field-programmable gate array (FPGA) 68 of the PCB 61 distributes this current to on board voltage regulators (not shown). The voltage regulators may then recharge the power supply 28 via the battery (power supply) input 66, or the MCU 63/FPGA 68 may distribute the current directly to the PCB connector 62 and the heater power connector 64 (as described below in more detail). In an embodiment, the power supply connector 22 is electrically connected to the heater power connector 64, where the power supply connector 22 is used to send a supply of electrical current directly to the heater power connector 64, thereby circumventing the power supply 28. In an embodiment, the power supply connector 22 includes a cable 22*b* connected to a wall charger 22*c*. Optionally, a universal serial bus (USB) connector 24 is connectable to the back of the device 10 (or, the USB connector 24 is included in lieu of the power supply connector 22), where the connector 24 provides a D/C current to the PCB 61. A USB cable 24*b* may be connectable to a wall-charger 24*c*, or optionally the cable 24*b* may be connectable to a mobile device (not shown), in order to provide the electrical current to the PCB 61.

The jet dispensing cartridge 30 may be held in place, in part, due to a PCB interface 34 on a lower portion of the cartridge 30 (shown in better detail in FIGS. 4, 7, 9, 10, 11 and 12), where a distal end of the PCB interface 34 is fitted into a printed circuit board (PCB) edge female-connector 58 in order to be firmly held in place against a relay board housing 50. A row of input/output (I/O) pads 34*a* (shown in FIG. 9) are included on the distal end of the PCB interface 34, where the I/O pads 34*a* electrically connect the PCB interface 34 to the PCB female-connector 58. The PCB female-connector 58 is housed in a relay board housing 50, where the housing 50 protects and cover the relay board 56. The relay board 56 provides a physical mounting location for the PCB female-connector 58 and a PCB male-connector 60. The PCB male-connector 60 is mounted on a surface of the relay board 56, where a PCB female-connector 62 snaps onto a PCB male-connector 60 in order to electrically connect the two connectors 60/62. The PCB male-connector 60 is electrically connected to the power supply 28, where the PCB male-connector 60 supplies electrical current from the power supply 28 to the PCB edge connector 58, via the relay board 56 and the PCB female-connector 62 (as described below in more detail).

In an embodiment, the cartridge 30 is detachable from the main housing 12, where the cartridge 30 is easily accessible due to a removal of the cartridge housing 16 from the main housing 12 of the device 10. This allows the cartridge 30 to be a replaceable element of the device 10, allowing a spent (e.g., used) cartridge 30 to be removed from the device 10, and replaced with a cartridge 30 with a reservoir 21*a* that is fully-charged with pre-vapor formulation 21.

Figure 14:
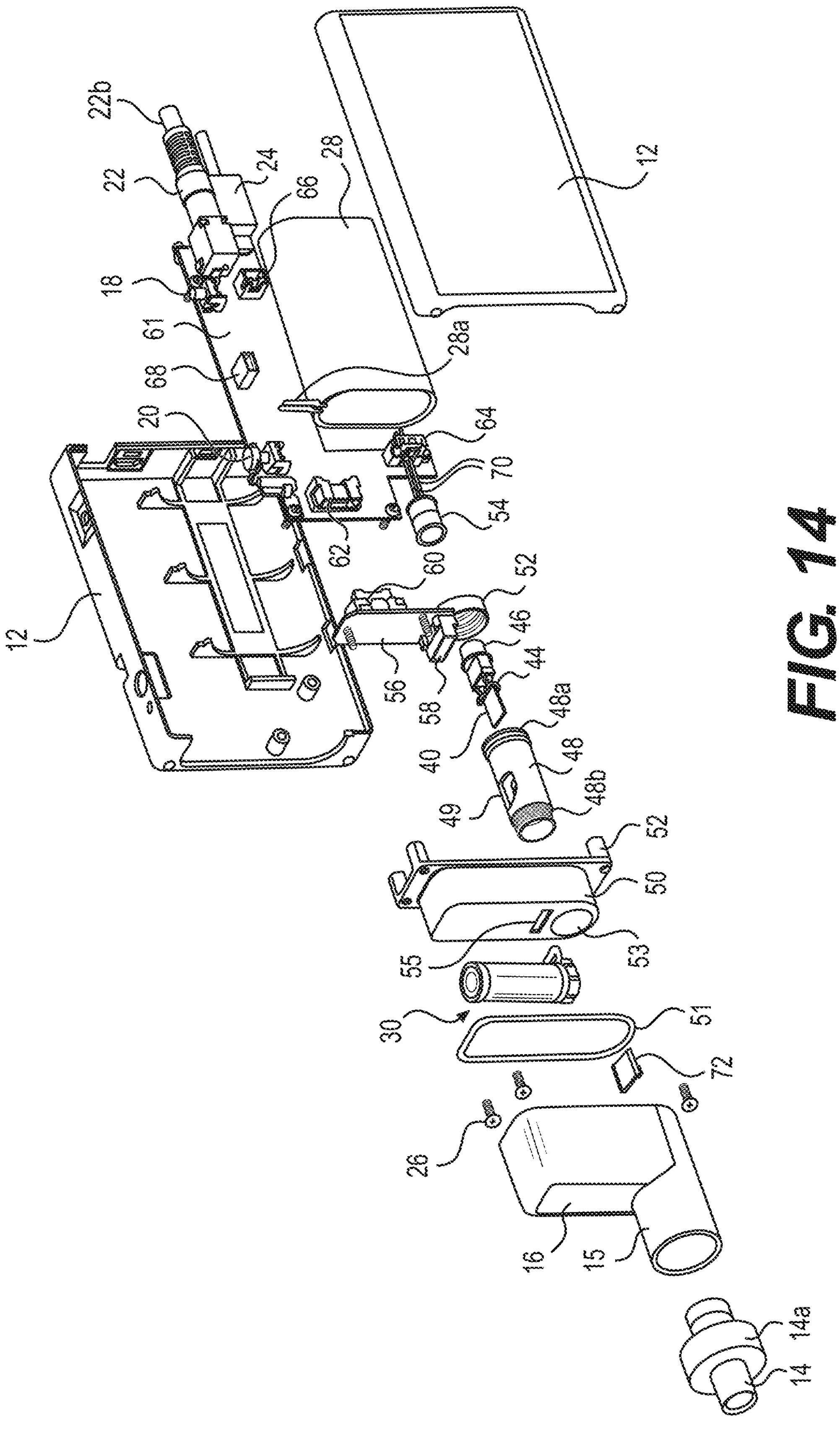
FIG. 14 is an illustration of an exploded view of the e-vaping device of FIG. 1, in accordance with an example embodiment.

The PCB 61 is positioned within the housing 12 (also see FIG. 14). The PCB 61 includes the MCU 63 and the FPGA 68 (where the MCU 63 and FPGA 68 are collectively called 'control circuitry'). The MCU 63 has three basic functions: 1) provide an interface to a control and configuration application program accessible through the USB receptacle 24*a* (FIG. 3), which may allow an adult vaper to set device parameters (such as an ejection frequency, pulse duration, system voltage, a pre-heat temperature, a vaporizing temperature, etc.), 2) provide an input for the power switch 18 and the heat activation switch 20, in order to control basic operations for the device, and 3) activate and transmit control parameters to the FPGA 68. In an embodiment, the MCU 63 may be a generic, low-cost controller, that can generate precision pulses, within nano-second resolution, in order to control device 10 functions, such as providing power to the cartridge 30 (as described below), for instance. Meanwhile, the FPGA 68 may be a control element that directly interfaces with the dispensing chip 41. In particular, the FPGA 68 produces ejection pulses, within a timing resolution of 10 ns to 50 ns, for precision control of the dispensing chip 41 (as described below, in detail). Optionally, the MCU 63 and FPGA 68 may be a single processor/controller, rather than two separate elements.

The power supply connector 22 and/or the USB connector 24 may be insertable into the back of the device 10, where the connectors 22/24 are electrically connected to a power supply input 66 that is included on the PCB 61. Specifically, a power input receptacle 22*a* and/or a USB receptacle is used to partially-form this electrical connection, where the power supply input 66 is electrically connected to the power supply 28. In the event the power supply 28 is rechargeable (for continued use of the device 10 following an initial depletion of the power supply 28), the power supply input 66 allows the power supply connector 22 and/or the USB connector 24 to recharge the power supply 28.

The power supply 28 may be a battery. In particular, the power supply 28 may be a Lithium-ion battery, or one of its variants, for example a Lithium-ion polymer battery. Alternatively, the battery may be a Nickel-metal hydride battery, a Nickel cadmium battery, a Lithium-manganese battery, a Lithium-cobalt battery or a fuel cell. In an embodiment, the e-vaping device 10 is usable until the energy in the power supply 28 is depleted. Alternatively, the device 10 may be rechargeable and reusable, such that the power supply 28 is chargeable via the power supply connector 22 and/or the USB connector 24.

In an embodiment, a power switch 18 is connected to the PCB 61, where the power switch 18 turns the device 10 "on" and "off." Specifically, when the power switch 18 is depressed to turn the device 10 "on," the MCU 63/FPGA 68 on the PCB 61 causes an electrical current to be sent from the power supply connector 22, the USB connector 24 and/or the power supply 28, to the PCB connector 62. The PCB connector 62 sends the electrical current through the PCB connector 60, the relay board 56, through the PCB edge connector 58, and to the PCB interface 34 in order to power the dispensing chip 41 (see FIGS. 7 and 9) of the cartridge 30 (as described below in more detail). When the power switch 18 is "on," the MCU 63/FPGA 68 on the PCB 61 further sends an electrical current from the power supply connector 22, the USB connector 24 and/or the power supply 28, to the heater power connector 64. The heater power connector 64 sends the electrical current through the heater connector 54, through the heater tongs 44, and on to the heater 40. When the power switch 18 is depressed to turn the device 10 "off," the PCB 61 ceases to send an electrical current to the PCB connector 62 and the heater power connector 64.

In an embodiment, the heat activation switch 20 is also connected to the PCB 61, where the heat activation switch 20 controls functions of the cartridge 30 and the heater 40. Specifically, once the device 10 is in an "on" configuration (as described above), the MCU 63/FPGA 68 is configured to allow the heat activation switch 20 to be depressed in order to cause the cartridge 30 to simultaneously discharge a pre-vapor formulation 21 (as described below in more detail with regard to the function of the cartridge 30), while also electrically activating the heater 40 in order to cause the heater 40 to heat and vaporize the pre-vapor formulation 21 that is jetted from the cartridge 30 onto the heater 40. In an embodiment, the MCU 63/FPGA 68 is configured to electrically activate the cartridge 30 and the heater 40 (caused by a depression of the heat activation switch 20), where this electrical activation occurs for a defined period of time, such as a period of 10 seconds (or, another such period of time, that may be adequate to allow for the discharge of the pre-vapor formulation 21 from the cartridge 30, and the vaporization of the pre-vapor formulation 21 by the heater 40).

Optionally, rather than a heat activation switch 20 being connected to the PCB 61, a sensor 80 and control circuitry 82 is instead included on the PCB 61 in order to automate the activation of the cartridge 30 and the heater 40, once the device 10 is turned on via the power switch 18. Specifically, the sensor 80 is in fluid communication with the inner chamber of the heater housing 48, due to the presence of one or more vias 81 on a back wall of the heater housing 48, where the sensor 80 detects 'vaping conditions' (discussed below). Once the sensor 80 detects the vaping conditions the circuitry 82 provides an electrical current from the power supply 28 to the cartridge 30 (through the connectors 60/62) and the heater 40 (through the heater connector 54) in order to cause the cartridge 30 discharge the pre-vapor formulation 21 onto the heater 40, so that the heater 40 then vaporizes the pre-vapor formulation 21.

The sensor 80 is configured to generate an output indicative of a magnitude and direction of airflow (flowing through the heater housing 48), where the circuitry 82 receives the sensor 80 output and determine if the following 'vaping conditions' exist: (1) a direction of the airflow indicates a draw on the mouthpiece 14 (versus blowing air through the mouthpiece 14), and (2) a magnitude of the airflow exceeds a threshold value. If these internal vaping conditions of the device 10 are met, the circuitry 82 electrically connects the power supply 28 to the cartridge 30 and the heater 40, thereby activating both the cartridge 30 and the heater 40. In an alternate embodiment, the sensor 80 generates an output indicative of a pressure drop within the housing 12 (which is caused by a draw of air entering the heater housing 48 through the vent holes 42, and exiting the device 10 through the mouthpiece 14), whereupon the circuitry 82 activates the cartridge 30 and the heater 40, in response thereto. The sensor 80 may be a sensor as disclosed in "Electronic Smoke Apparatus," U.S. application Ser. No. 14/793,453, filed on Jul. 7, 2015, or a sensor as disclosed in "Electronic Smoke," U.S. Pat. No. 9,072,321, issued on Jul. 7, 2015, each of which is hereby incorporated by reference in their entirety into this document.

The power source 28 may be electrically connected to the sensor 80 and circuitry 82 in order to automatically control an operation of the device 10, once the device is turned on via the power switch 18. In an embodiment, the device 10 is automatically electrically activated solely via the sensor 80 and the circuitry 82, such that the power switch 18 is not required to turn the device 10 on and off. In an embodiment, the circuitry 82 includes a time-period limiter. The time-period of the electric current supply to the cartridge 30 and the heater 40 may be set or pre-set depending on an amount of pre-vapor formulation 21 desired to be vaporized.

Even in the event that the optional sensor 80 and circuitry 82 is not included in the device 10, the device 10 still may optionally include one or more vias 81 (which, may optionally be adjacent to the heater holder 46), in order to allow air from inside the housing 12 to enter the chimney 48. The vias 81 provide a supplemental supply of air to the chimney 48, in order to supplement air that is introduced into the chimney 48 via the vent holes 42. In an alternative embodiment, the vias 81 are provided in lieu of the vent holes 42, such that the vias 81 may optionally be the sole source of air that is introduced into the chimney 48 during operational use of the device 10. In the event that the vias 81 are included in the device 10, the housing 12 shall not be air-tight, to allow air to enter the housing 12 without greatly increasing a necessary resistance-to-draw (RTD) for the device 10.

The cartridge 30 provides a consistent and reliable distribution of the pre-vapor formulation 21 onto the heater 40 by jetting the pre-vapor formulation 21 onto the heater 40 (as described in detail below). Use of the cartridge 30 ensures that the device 10 does not require that the pre-vapor formulation 21, or any structure, be in continuous and/or direct contact with the heater 40, especially during periods of extended storage and/or non-use of the e-vaping device 10.

Pre-Vapor Formulation:

The jet dispensing cartridge 30 of the device 10 contains and discharges a pre-vapor formulation 21. In an embodiment, the pre-vapor formulation 21 is a relatively high-viscosity, high-density formulation, that is a material or a combination of materials that is transformed into a vapor. For example, the pre-vapor formulation 21 may be a liquid, a solid and or a gel formulation including, but not limited to, water, beads, solvents, active ingredients, ethanol, plant extracts, natural or artificial flavors, and/or vapor formers such as glycerin and propylene glycol. In an embodiment, the pre-vapor formulation 21 has a viscosity in the range of about 1 cP to 100 cP (or, preferably 40 cP to 100 cP, or more preferably 40 cP to 80 cP), and a density in the range of about 1.0 g/mm$^3$ to 1.3 g/mm$^3$ (at a temperature of 25° C.).

In an embodiment, the pre-vapor formulation 21 includes volatile tobacco flavor compounds which are released upon heating. The pre-vapor formulation 21 may also include tobacco elements dispersed throughout the formulation 16. When tobacco elements are dispersed in the pre-vapor formulation 21, the physical integrity of the tobacco element is preserved. For example, the tobacco element is 2-30% by weight within the pre-vapor formulation 21. Alternatively, the pre-vapor formulation 21 may be flavored with other flavors besides a tobacco flavor, or in addition to a tobacco flavor.

In an embodiment, the at least one vapor former of the pre-vapor formulation 21 may be selected from a group including a diol (such as propylene glycol and/or 1,3-propanediol), glycerin and combinations thereof. The at least one vapor former is included in an amount ranging from about 20% by weight based on the weight of the pre-vapor formulation 21 to about 90% by weight based on the weight of the pre-vapor formulation 21 (for example, the vapor former is in the range of about 50% to about 80%, more preferably about 55% to 75%, or most preferably about 60% to 70%). Moreover, in an embodiment, the pre-vapor formulation 21 includes a diol and glycerin in a weight ratio that ranges from about 1:4 to 4:1, where the diol is propylene glycol, or 1,3-propanediol, or combinations thereof. This ratio is preferably be about 3:2.

The pre-vapor formulation 21 also includes water. Water is included in an amount ranging from about 5% by weight based on the weight of the pre-vapor formulation 21 to about 40% by weight based on the weight of the pre-vapor formulation 21, and more preferably in an amount ranging from about 10% by weight based on the weight of the pre-vapor formulation 21 to about 15% by weight based on the weight of the pre-vapor formulation 21. In an embodiment, the remaining portion of the pre-vapor formulation 21 that is not water (and nicotine and/or flavoring compounds), is the vapor former (described above), where the vapor former is between 30% by weight and 70% by weight propylene glycol, and the balance of the vapor former is glycerin.

The pre-vapor formulation 21 optionally may include at least one flavorant in an amount ranging from about 0.2% to about 15% by weight (for instance, the flavorant may be in the range of about 1% to 12%, more preferably about 2% to 10%, and most preferably about 5% to 8%). The at least one flavorant may be a natural flavorant, or an artificial flavorant. For instance, the at least one flavorant may be selected from the group including tobacco flavor, menthol, wintergreen, peppermint, herb flavors, fruit flavors, nut flavors, liquor flavors, roasted, minty, savory, cinnamon, clove, and combinations thereof.

In an embodiment, the pre-vapor formulation 21 includes nicotine. The nicotine is included in the pre-vapor formulation 21 in an amount ranging from about 1% by weight to about 10% by weight (for instance, the nicotine is in the range of about 2% to 9%, or more preferably about 2% to 8%, or most preferably about 2% to 6%). In an embodiment, the portion of the pre-vapor formulation 21 that is not nicotine and/or a flavorant, includes 10-15% by weight water, where the remaining portion of the non-nicotine and non-flavorant portion of the formulation is a mixture of propylene glycol and a vapor former that is in a ratio that ranges between 60:40 and 40:60 by weight.

Heater:

In an embodiment, the heater 40 has a major surface or axis that is positioned to be about perpendicular to a discharge direction 30*z* (shown in FIG. 3) of the pre-vapor formulation 21 that is discharged from the cartridge 30. The heater 40 may be in the form of a planar body or a ceramic body. In an alternative embodiment, the heater 40 may also be a wire coil, a single wire, a cage of resistive wire, or any other suitable form that is configured to vaporize the pre-vapor formulation 21. In an embodiment, the heater 40 has a roughened and/or textured surface that provides a greater contact surface between the heater 40 and the dispersed pre-vapor formulation 21 that spreads over an upper surface of the heater 40 by the cartridge 30. In an embodiment, the heater 40 is a planar heater, such as the heater disclosed within the following patent application: "Three-Piece Electronic Vaping Device with Planar Heater," U.S. application Ser. No. 15/457,917, filed on Mar. 13, 2017, the entire contents of which is hereby incorporated by reference in its entirety. In another embodiment, the heater 40 has a non-planar surface, where the heater 40 is for instance be a printed heater on a flexible substrate.

In at least one example embodiment, the heater 40 is formed of any suitable electrically resistive materials. Examples of suitable electrically resistive materials includes, but is not limited to, copper, titanium, zirconium, tantalum and metals from the platinum group. Examples of suitable metal alloys include, but are not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heater 14 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 40 may include at least one material selected from the group consisting of stainless steel, copper, copper alloys, nickel-chromium alloys, super alloys and combinations thereof. In an example embodiment, the heater 40 may be formed of aluminum nitride, ceramic, nickel-chromium alloys or iron-chromium alloys. In an embodiment, the heater 40 may be a ceramic heater having an electrically resistive layer on an inner surface and/or an outer surface of the heater 40.

In another embodiment, the heater 40 is constructed of an iron-aluminide (e.g., FeAl or $Fe_3Al$). Use of iron-aluminides can be advantageous in that they exhibit high resistivity. FeAl exhibits a resistivity of approximately 180 micro-ohms, whereas stainless steel exhibits approximately 50 to 91 micro-ohms. The higher resistivity lowers the current that is required to energize the heater 40.

The heater 40, or heating element, attain and sustain a temperature for vaporizing the pre-vapor formulation 21 that is deposited onto the heater 40. An optimal temperature varies according to the chemical properties and composition of the pre-vapor formulation 21. In an embodiment, a preferred temperature range for vaporizing the pre-vapor formulation 21 is between about 220 and 360° C. In another embodiment, a closed-loop control mechanism (as described below, in the 'Operational Use of the E-Vaping Device' section of this document) is used to maintain the heater 40 at a preferred temperature range for vaporizing the pre-vapor formulation 21.

Jet Dispensing Cartridge—Example Structural Embodiments:

The jet dispensing cartridge 30 (shown in detail in FIGS. 4-13, and described below) uses jet dispensing to eject small droplets of the pre-vapor formulation 21 onto the heater 40 (see FIG. 3). Specifically, the cartridge 30 uses "bubble jet" dispensing of the pre-vapor formulation 21 to create the small droplets, where the cartridge 30 heats and vaporizes the pre-vapor formulation 21 to create small bubbles and where an expansion of the bubbles creates droplets that are ejected from the cartridge 30. In particular, the cartridge 30 can be considered a "thermal drop-on-demand, bubble jet cartridge," where the pre-vapor formulation 21 is thermally excited to create a rapid vaporization of the pre-vapor formulation 21 that forms the bubbles, and a subsequent large pressure increase (due to the formation of the bubbles) is used to discharge high-velocity droplets of the pre-vapor formulation 21 that is expelled from the cartridge 30. In an embodiment, the cartridge 30 uses a relatively high viscosity pre-vapor formulation 21, as the high surface-tension of the pre-vapor formulation 21 (created by the highly viscous properties of the pre-vapor formulation 21), as well as forces associated with a condensation and a resultant contraction of the vaporized bubbles in the cartridge 30, act to pull a charge of the pre-vapor formulation 21 through one or more vias 41*a* (see FIGS. 7-9) in communication with a pre-vapor formulation reservoir 21*a* (within cartridge 30), in order to accurately and reliably eject the droplets onto a surface of the heater 40.

Figure 4:
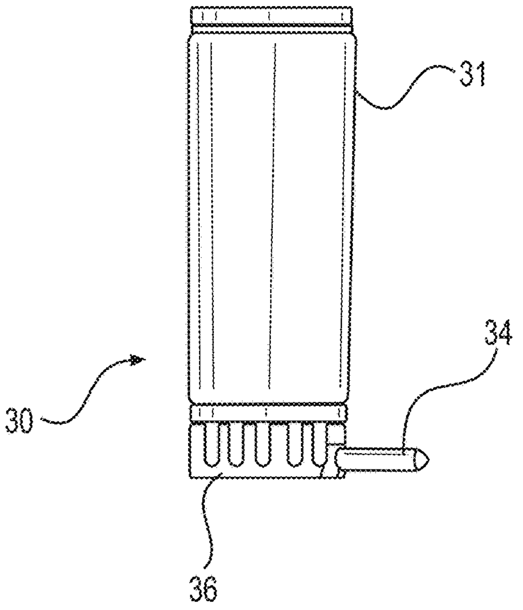
FIG. 4 is an illustration of a side-view of a jet dispensing cartridge for the device of FIG. 1, in accordance with an example embodiment.

FIG. 4 is an illustration of a side-view of a jet dispensing cartridge 30 for the device of FIG. 1, in accordance with an example embodiment. The cartridge 30 includes a housing 31, with a nose 36 sealing an end of the cartridge 30. A PCB interface 34 projects away from a bottom portion of the housing 31. While a cylindrical housing 31 is shown in FIG. 4, it should be understood that housing 31 may take other shapes, including but not limited to a cubic shape, a rectangular shape, a square shape, etc.

Figure 5:
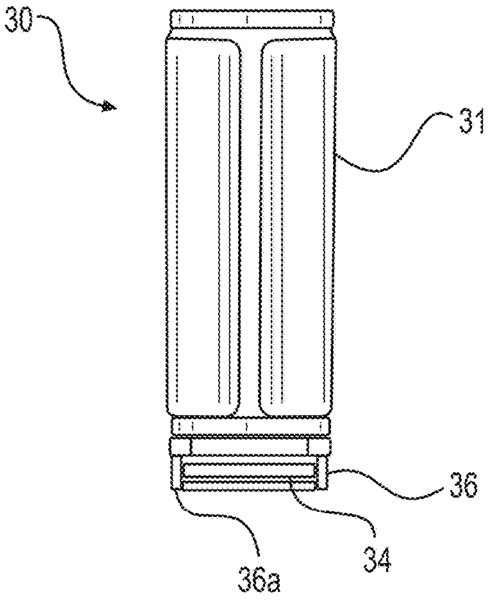
FIG. 5 is an illustration of a front-view of the jet dispensing cartridge of FIG. 4, in accordance with an example embodiment.

FIG. 5 is an illustration of a front-view of the jet dispensing cartridge 30 of FIG. 4, in accordance with an example embodiment. The nose 36 of the cartridge 30 includes a raised lip 36*a* that extends from a bottom portion of the housing 31 in order to protect and shelter the PCB interface 34, as well as the remainder of the PCB substrate 32 (as shown in at least FIGS. 6, 9 and 11).

Figure 6:
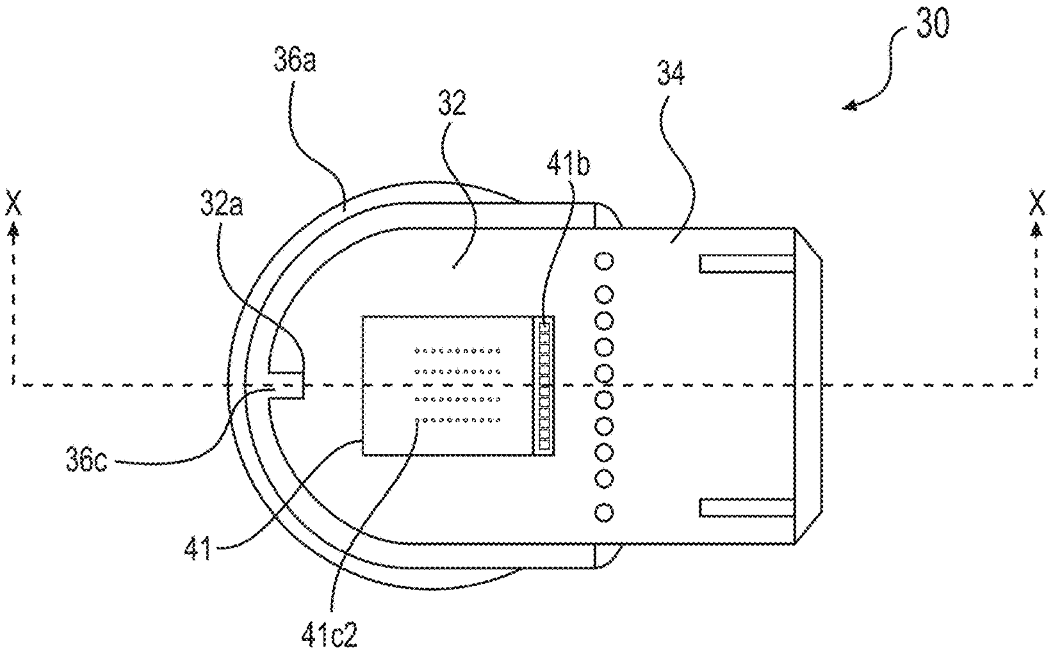
FIG. 6 is an illustration of a bottom-view of the jet dispensing cartridge of FIG. 4, in accordance with an example embodiment.

FIG. 6 is an illustration of a lower or bottom view of the jet dispensing cartridge 30 of FIG. 4, in accordance with an example embodiment. The PCB substrate 32 is retained at the end of the cartridge 30, where ejection nozzles 41*c*2 of ejectors 41*c* on chip 41 (see FIGS. 7 and 8) face downward in order to eject bubbles (i.e., solid droplets) of pre-vapor formulation 21 away from the cartridge 30 (as described herein, in more detail). That is to say, in an embodiment, the ejection nozzles 41*c* are positioned underneath the cartridge 30 in order to cause the cartridge 30 to optionally eject the bubbles of pre-vapor formulation 21 in a direction that is about parallel with a longitudinal length of the cartridge 30 (as depicted in FIG. 3, by the discharge direction 30*z* of the cartridge 30).

Figure 10:
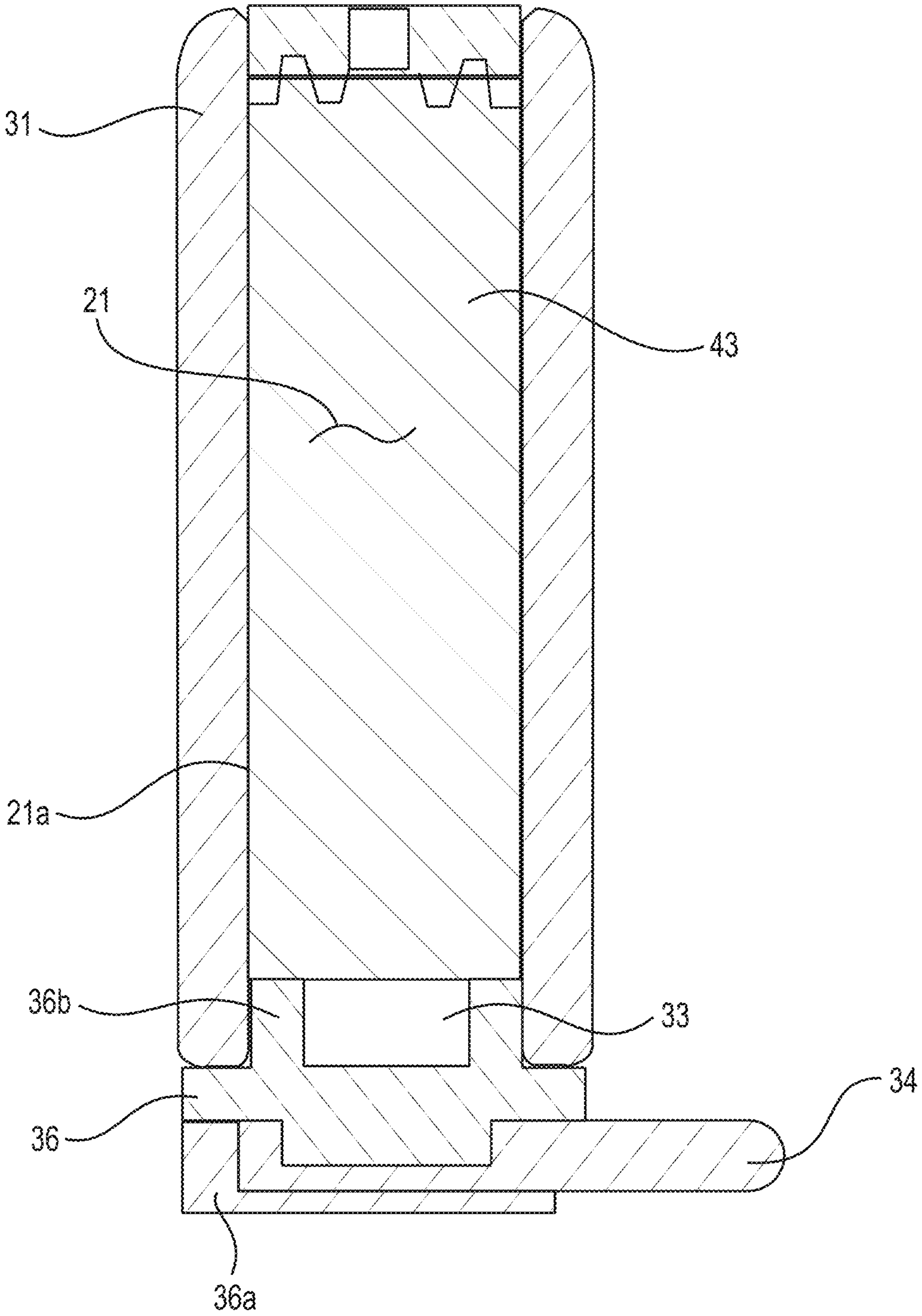
FIG. 10 is an illustration of a cross-sectional view of the jet dispensing cartridge of FIG. 4, in accordance with an example embodiment.

The PCB substrate 32 is held within the protective confines of the raised lip 36*a* of the nose 36 of the cartridge 30, where a stub 36*c* on the lip 36*a* mates with a notch 32*a* of the substrate 32 in order to maintain the substrate 32 within a fixed orientation on a bottom of the cartridge 30. Furthermore, the substrate 32 is affixed to the bottom of the cartridge 30, within the confines of lip 36*a*, via any well-known means that may include an adhesive (such as a silicone-based adhesive, for example), welding, screws, detents, physical stops, or any other suitable structure and/or adhesive substance. A cross-sectional view of the cartridge 30, along line X-X, is illustrated in FIG. 10 (described below).

Figure 7:
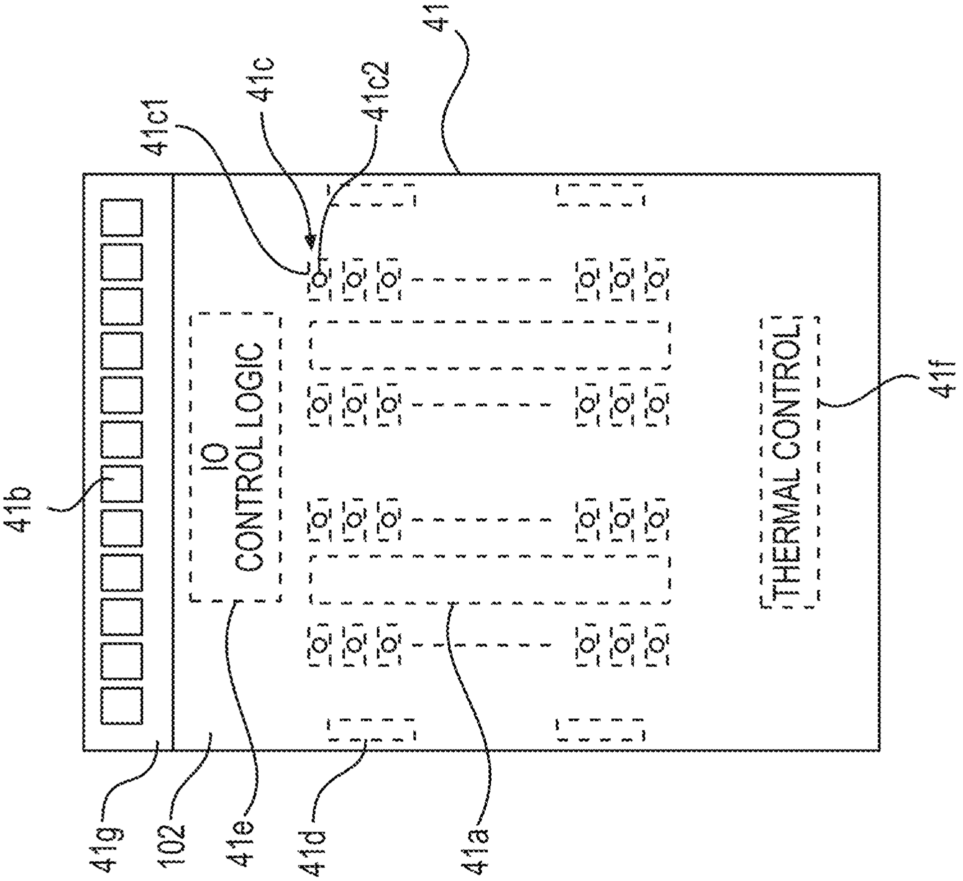
FIG. 7 is an illustration of the bottom surface of the dispensing chip within the PCB substrate of FIG. 6, in accordance with an example embodiment.

FIG. 7 is an illustration of a bottom-surface (active-element side 41*g*) of the dispensing chip 41 that is held within the PCB substrate 32 of FIG. 6, in accordance with an example embodiment. The chip 41 may include a row of I/O pads 41*b* that electrically connect ejection heaters 41*c*1 (FIG. 8), substrate heaters 41*d* (FIG. 8), and circuits of the chip 41 (i.e., the I/O control logic 41*e*, and the thermal control 41*f*, shown in FIG. 7) to the I/O pads 34*a* (FIG. 9) of the PCB substrate 32. The chip 41 includes one or more ejectors 41*c* (also shown in FIG. 8) that discharge the bubbles of the pre-vapor formulation 21 through the nozzles 41*c*2 and toward the heater 40. The ejector 41*c*, and the vias 41*a* of the ejector 41*c*, may be formed by the processes described in the following patents: "Ink Jet Printheads and Methods Therefor," U.S. Pat. No. 6,902,867, and "Methods for Improving Flow Through Fluidic Channels," U.S. Pat. No. 7,041,226, the entire contents of each of which is hereby incorporated by reference in their entirety into this document. In an embodiment, the chip 41 includes two vias 41*a*, where the vias 41*a* are positioned so that the longitudinal lengths of the vias 41*a* are parallel to each other on the chip 41. It should be understood that any well-known method of forming the vias 41*a* on the chip 41 may also be implemented, aside from the example processes described above.

Rows of ejectors 41*c* line the sides of the vias 41*a*, along a longitudinal length of the vias 41*a*. The array of ejectors 41*c* thermally excite and rapidly vaporize the pre-vapor formulation 21 from the reservoir 21*a* of the cartridge in order to form bubbles, where a subsequently large pressure increase (due to the formation and growth of the bubbles) forces the pre-vapor formulation 21 from the channel 33 into the ejector fluid chambers 41*c*3 of the ejection heaters 41*c*1 (see FIG. 8) in order to expel high-velocity droplets of the pre-vapor formulation 21 from the nozzles 41*c*2 and toward the heater 40. In response to this bubble formation and expulsion, additional pre-vapor formulation 21 is drawn through the channel 33, via a positive displacement force. In an embodiment, a row of 32 ejectors 41*c* lines both sides of each of the vias 41*a* (such that 128 ejectors 41*c* exist on the chip 41), where a total of 8 ejection heaters 41*c*1 may be energized at a same time for each via 41*a* (at an ejection frequency of 2 kHz), such that all 128 ejectors 41*c* combine to eject up to approximately 10 micro-liters/second of a pre-vapor formulation 21, or preferably about 3-6 micro-liters/second of a pre-vapor formulation 21, or most preferably about 3.2 micro-liters/second of a pre-vapor formulation 21. In an embodiment, the ejection heaters 41*c*1 (also shown in FIG. 8) provide rapid heating, where the ejection heaters 41*c*1 reach a temperature of about 320° C. in less than 1 μs. A vapor mass that is produced by the heater 40 of the e-vaping device 10, based on this vaporization of the pre-vapor formulation 21 by the ejectors 41*c*, is about 2 to 3 mg per vapor-draw from the device 10.

In an embodiment, a significant portion of the upper surface of the active-element side 41*g* of the chip 41 is covered with a nozzle plate 102 (also shown in FIG. 8), such that the I/O pads 41*b* and the nozzle holes 41*c*2 (of the ejectors 41*c*) are the only elements that are exposed on the active-element side 41*g* of the chip 41.

In an embodiment, the ejectors 41*c* (FIG. 8) and the heater 40 (FIG. 3) produce a vapor exit-temperature for the device 10 (at the mouthpiece 14) that is about 100° C. The ejectors 41*c* may be formed by the processes described in the following patents: "Ink Jet Heater Chip and Method Therefor," U.S. Pat. No. 6,951,384, and "Micro-Fluid Ejection Device having High Resistance Heater Film," U.S. Pat. No. 7,080,896, the entire contents of which is hereby incorporated by reference in their entirety. The nozzles 41*c*2 of the ejectors 41*c*, which can be referred to as "micro-nozzles," can be formed by the processes described in the following patents: "Nozzle Members, Compositions and Methods for Micro-Fluid Ejection Heads," U.S. Pat. No. 7,364,268, "Micro-Fluid Ejection Head and Stress Relieved Orifice Plate therefor," U.S. Pat. No. 8,109,608, "Photoimageable Dry Film Formulation," U.S. Pat. No. 8,292,402, and "Hydrophobic Nozzle Plate Structures for Micro-Fluid Ejection Heads," U.S. Pat. No. 7,954,926, the entire contents of which is hereby incorporated by reference in their entirety. In an embodiment, each of the ejectors 41*c* include one nozzle 41*c*2. It should be understood that any well-known method of forming the ejectors 41*c* on a bubble jet chip 41, and forming micro-nozzles 41*c*2 within the ejectors 41*c*, may also be implemented, aside from the example processes described above.

The dispensing chip 41 also includes one or more substrate heaters 41*d*. The substrate heaters 41*d* are used to warm the dispensing chip 41, at periods just prior to, or during, activation and use of the ejection heaters 41*c*1. In an embodiment, four substrate heaters 41*d* are included on the chip 41, where the substrate heaters 41*d* are somewhat spaced-apart from each other on the chip 41. The chip 41 may also include I/O control logic 41*e* that controls an overall operation of the chip 41, including controlling an activation of the heaters 41*c*1/41*d*, and controlling a transmission and reception of control signals between the I/O pads 41*b* of the chip 41 and the I/O pads of the PCB substrate 32. The dispensing chip 41 may also include a thermal control circuit 41*f*, that actively controls a temperature of the substrate heaters 41*d* during startup and operational use of the chip 41. It should be understood that any well-known configuration of a bubble jet dispensing chip may be used in conjunction with, or in place of, the dispensing chip 41 shown in FIG. 7, and described above.

Figure 8:
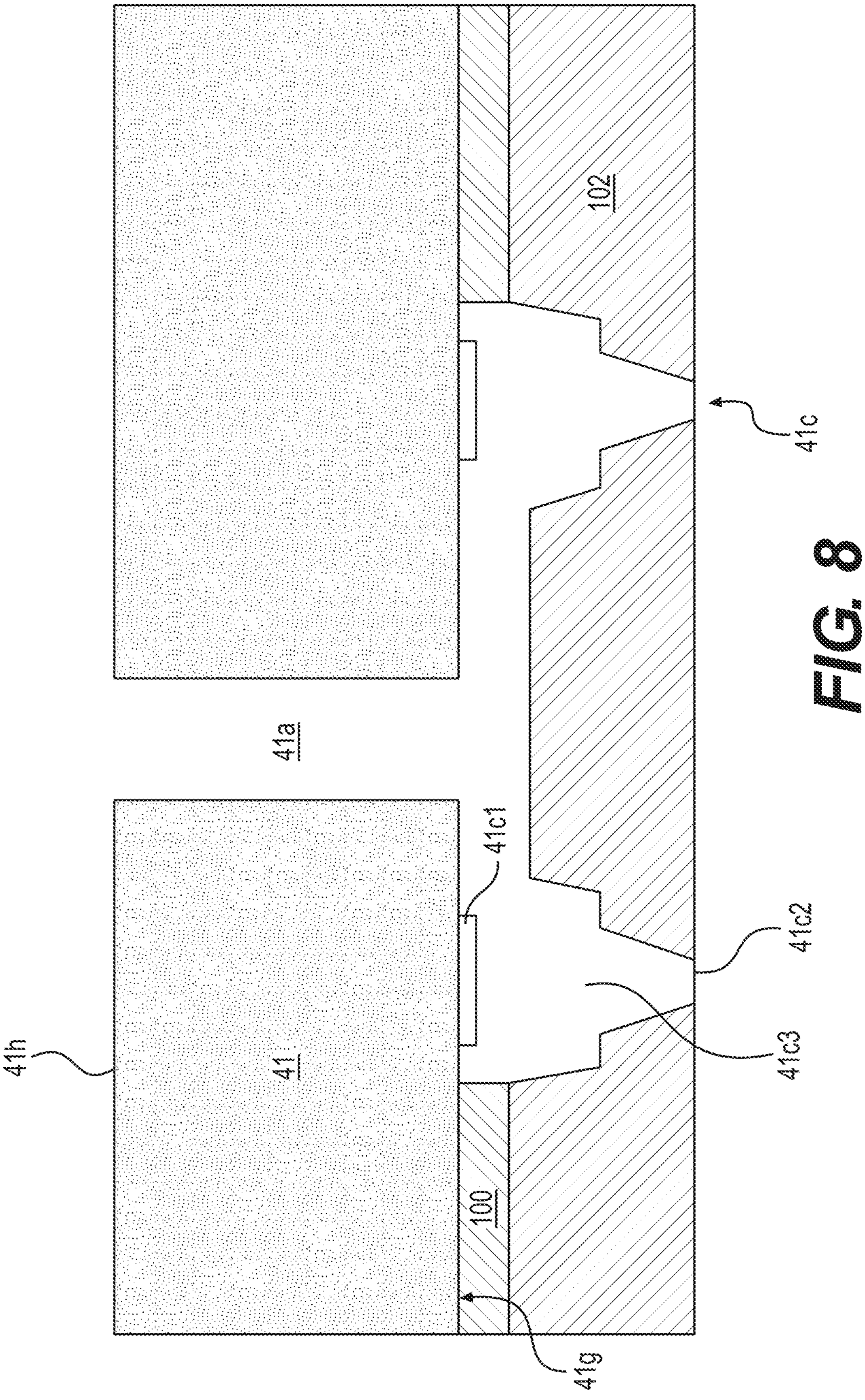
FIG. 8 is an illustration of a cross-sectional view of the ejectors of FIG. 7, accordance with an example embodiment.

FIG. 8 is an illustration of a cross-sectional view of two of the ejectors 41*c* of FIG. 7, in accordance with an example embodiment. The ejectors 41*c* are on the chip 41, where each of the ejectors 41*c* include: an ejection heater 41*c*1, an ejector fluid chamber 41*c*3, and a nozzle 41*c*2. The ejector fluid chamber 41*c*3 is a chamber structure that is defined by the nozzle plate 102, the thick film layer 100 and the active-element side 41*g* of the chip 41. The chamber 41*c*3 is in fluid communication with the via 41*a*, where the via 41*a* are in fluid communication with the channel 33 of the cartridge 30 (see FIG. 10). The ejectors 41*c* are configured to cause a rapid vaporization of the pre-vapor formulation 21 that is drawn through the via 41*a* and into the ejector fluid chamber 41*c*3, where the vaporization is caused by the ejector heaters 41*c*1. The rapid vaporization of the pre-vapor formulation 21 within the ejector fluid chamber 41*c*3 causes solid bubbles of the pre-vapor formulation 21 to be formed within the chamber 41*c*3, and subsequently ejected through nozzle 41*c*2, thereby drawing additional pre-vapor formulation 21 through the via 41*a* and into the ejector fluid chamber 41*c*3 via the positive displacement of the pre-vapor formulation 21. In an embodiment, the nozzles 41*c*2 have a conically-shaped discharge end (as shown in FIG. 8) that causes the discharged end to be tapered. In another embodiment, the nozzles 41*c*2 have a discharge end with straight nozzle walls (i.e., the nozzle 41*c*2 have a hole diameter that is uniform), causing the discharge end of the nozzle 41*c*2 to not be tapered.

The active element side 41*g* of the chip 41 may be significantly covered by a thick film layer 100, where a nozzle plate 102 is then cover the thick film layer 100. The nozzle plate 102 and the thick film layer 100 collectively helps define the ejector fluid chamber 41*c*3 and/or the nozzle 41*c*2. In an embodiment, the construction of the ejectors 41*c* may be made according to the disclosure of the "Micro-Fluid Ejection Devices," U.S. Pat. No. 7,165,831, issued on Jan. 23, 2007, the entire contents of which is hereby incorporated by reference in its entirety into this document.

Figure 9:
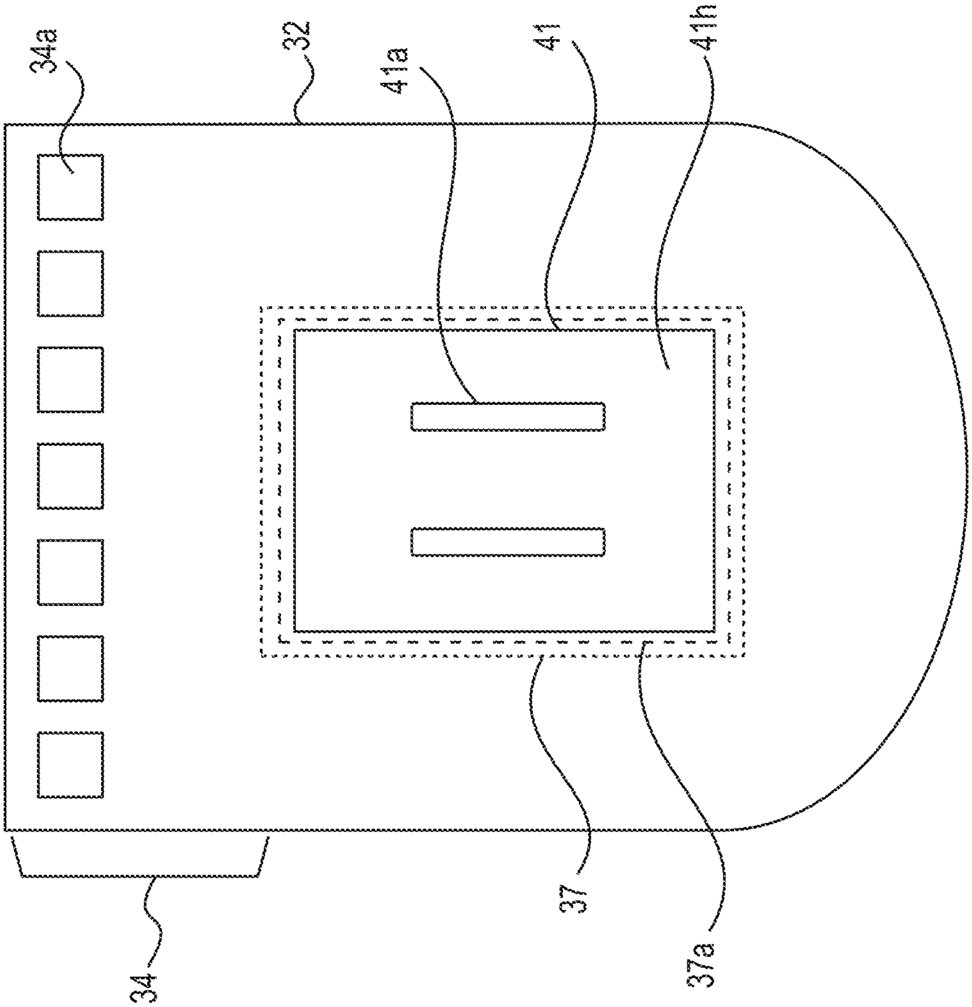
FIG. 9 is an illustration of the top surface of the PCB substrate of the jet dispensing cartridge of FIG. 4, in accordance with an example embodiment.

FIG. 9 is an illustration of a top-surface of the PCB substrate 32 of the jet dispensing cartridge 30, and the non-active-element side 41*h* of the chip 41 (also see FIG. 7), in accordance with an example embodiment. The PCB substrate 32 may include I/O pads 34*a* on a distal end of a PCB interface 34 of the substrate 32. The I/O pads 34*a* electrically connect the cartridge 30 to the connector 58 within the relay board housing 50, where the IO control logic 41*e* causes the pads 34*a* to also communicate information and commands to/from the dispensing chip 41 and the FPGA 68, in order to orchestrate the function of the cartridge 30 and the heater 40, as described herein.

The dispensing chip 41 is held within a chip window 37 of the substrate 32. In particular, during assembly of the cartridge 30, the substrate 32 is attached to the nose 36 of the cartridge (also see FIGS. 6 and 11), whereupon the chip 41 is inserted into the chip window 37, and held in place via an adhesive (sealant) 37*a*. The adhesive 37*a* may be a silicone-based adhesive, or any other suitable liquid-impermeable sealant that is applied between at least a portion of the juncture between the chip window 37 and the dispensing chip 41. The adhesive 37*a* may also be used to adhesively connect a top surface of the chip 41 to a bottom portion of the nose 36. The dispensing chip 41 (shown in better detail in FIG. 7) includes the ejectors 41*c* that discharge the pre-vapor formulation 21 from the reservoir 21*a*, upon activation of the cartridge 30.

FIG. 10 is an illustration of a cross-sectional view of the jet dispensing cartridge 30 of FIG. 6 (along line X-X of FIG. 6), in accordance with an example embodiment. The reservoir 21*a* is defined by the housing 31 of the cartridge 30, where a foam insert 43 is positioned within the reservoir 21*a*. The foam insert 43 may be a low density foam that contains the pre-vapor formulation 21. The foam insert 43 may be a porous structure including interstitial spaces that create capillary forces for providing a back-pressure that facilitates a steady supply of the pre-vapor formulation 21 that is discharged from the reservoir 21*a* to the dispensing chip 41 (see at least FIGS. 7 and 9, described above). It should be understood that other structures, such as micro-fluidic channels within the reservoir 21*a*, may be used in conjunction with, or in lieu of, the foam insert 43. A channel 33 exists between a bottom of the reservoir 21*a* and a top of the nose 36. Ejectors 41*c* (shown in FIGS. 7 and 8) are arranged in an array, where the ejectors 41*c* eject the pre-vapor formulation 21 from the channel 33, in order to eject the bubbles of pre-vapor formulation 21 towards the heater 40, as described below in more detail.

Figure 11:
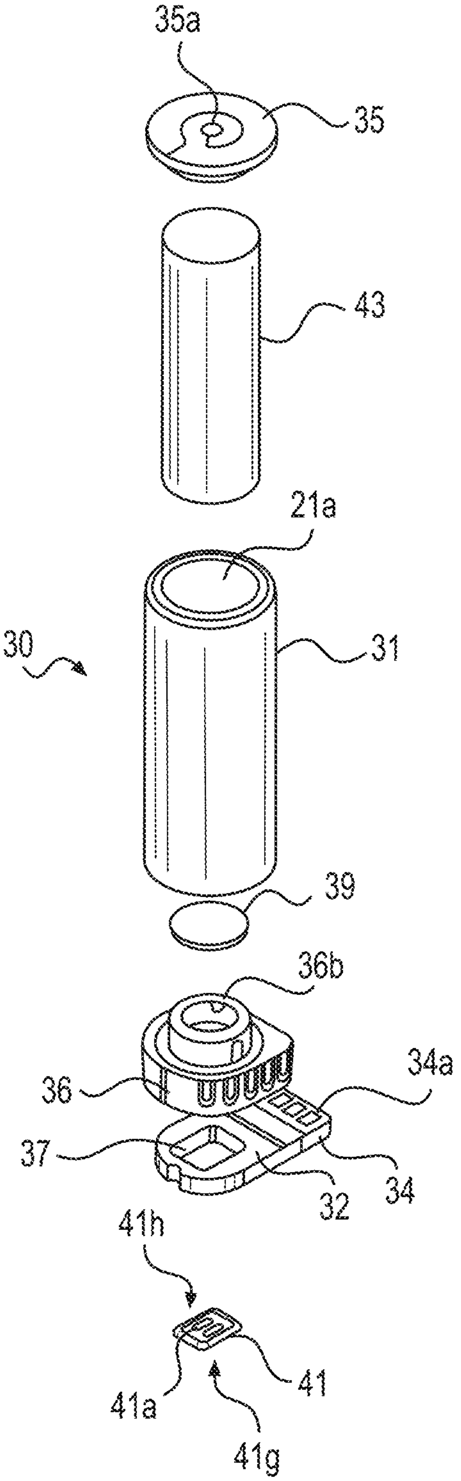
FIG. 11 is an illustration of an exploded view of the jet dispensing cartridge of FIG. 4, in accordance with an example embodiment.

FIG. 11 is an illustration of an exploded view of the jet dispensing cartridge 30 of FIG. 4, in accordance with an example embodiment. For brevity sake, previously described elements of the cartridge 30 are not again described, here. The cartridge 30 includes a lid 35 with a vent 35*a* that seals a top end of the cartridge 30. The vent 35*a* provides one-way venting in order to allow ambient air to enter the reservoir 21*a* as the pre-vapor formulation 21 is being dispensed from the cartridge 30. A top portion of the nose 36 includes a cylindrical protrusion 36*b* that defines the channel 33 (FIG. 10) that abuts a lower portion of the reservoir 21*a*. A filter 39 may exist between the nose 36 and the reservoir 21*a*, where the filter 39 can be a high-efficiency filter that is suitable for finely screening impurities within the pre-vapor formulation 21, as the pre-vapor formulation 21 is being ejected from the cartridge 30.

In an embodiment, the PCB substrate 32 defines a chip window 37, where the chip window 37 holds the dispensing chip 41. The dispensing chip 41 is fitted into the chip window so that the non-active-element side 41*h*, shown in detail in FIG. 9, faces up (i.e., toward the reservoir 21*a*), and the active-element side 41*g*, shown in detail in FIG. 7, faces down (i.e., away from the cartridge 30).

Figure 20:
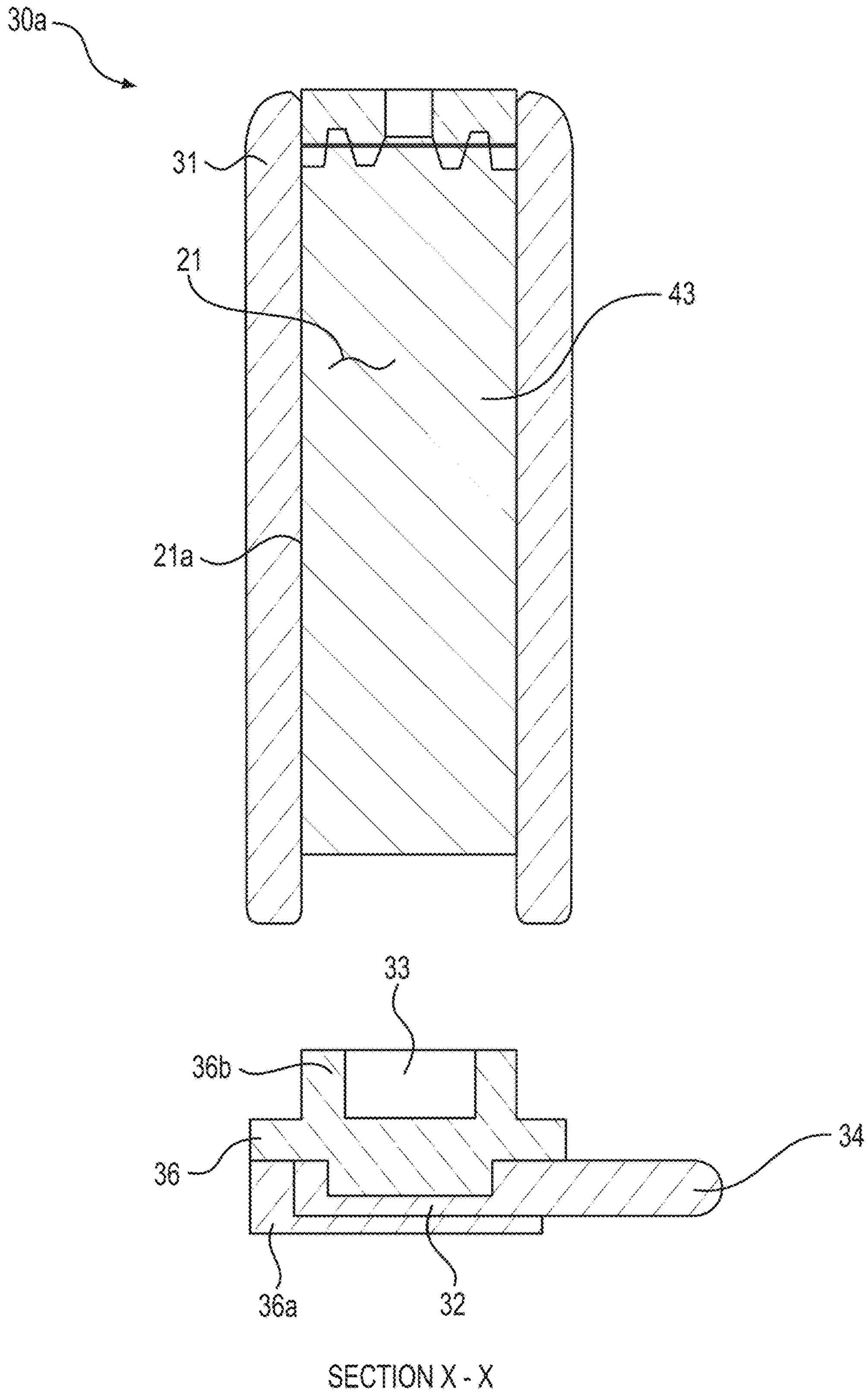
FIG. 20 is an illustration of another alternative embodiment of a cartridge for an e-vaping device, in accordance with an example embodiment.

While the jetting cartridge 30 of FIGS. 4-11 may integrate the pre-vapor formulation reservoir 21*a* and the dispensing chip 41 within a single cartridge unit, in an alternative embodiment the reservoir 21*a* and the dispensing chip 41 may be separated, in order to allow multiple reservoirs 21*a* to be used with a single dispensing chip 41 (as shown for instance in FIG. 20). That is to say, within the device 10, the reservoir 21*a* and/or the housing 31 of the cartridge 30 can be removable from the device 10, where the reservoir 21*a* and/or housing 31 may be replaceable and/or rechargeable. The reservoir 21*a* and/or the housing 31 is insertable into the device 10, in order to come into contact and, work in conjunction with, the dispensing chip 41 (where the dispensing chip 41 is permanently, or semi-permanently, affixed within the device 10).

Figure 12:
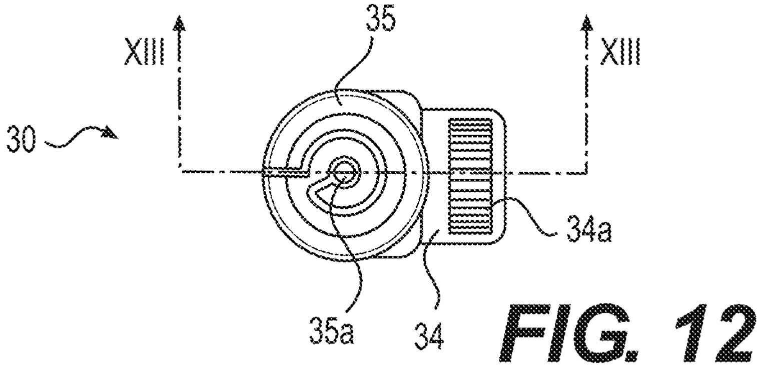
FIG. 12 is an illustration of an overhead-view of the jet dispensing cartridge of FIG. 4, in accordance with an example embodiment.

FIG. 12 is an illustration of an overhead-view of the jet dispensing cartridge 30 of FIG. 4, in accordance with an example embodiment. As discussed above, the lid 35 of the cartridge 30 includes the vent 35*a*. The one-way vent 35*a* allows ambient air to enter the housing 31 of the cartridge 30, in order to displace a volume of fluid that is depleted from the reservoir 21*a* during a discharging of the pre-vapor formulation 21 from the cartridge 30.

Figure 13:
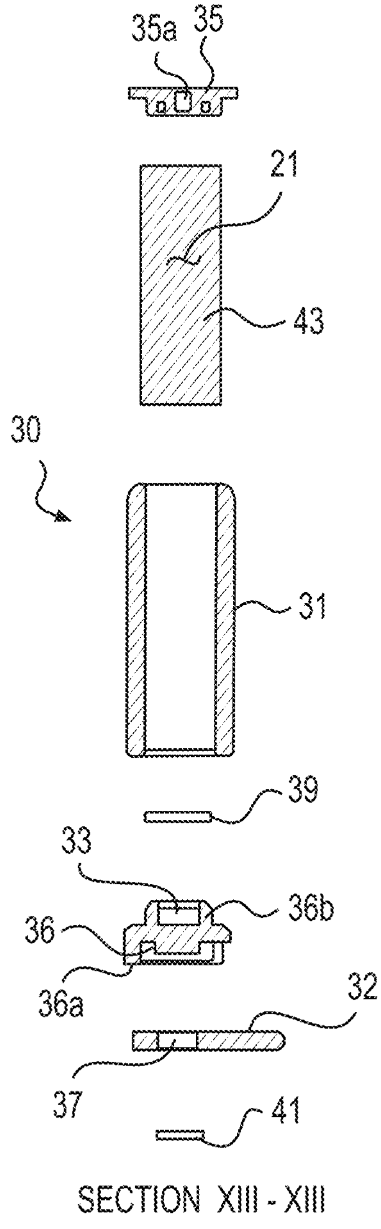
FIG. 13 is an illustration of an exploded, cross-sectional view of the jet dispensing cartridge of FIG. 4, in accordance with an example embodiment.

FIG. 13 is an illustration of an exploded, cross-sectional view of the jet dispensing cartridge 30 of FIG. 4, in accordance with an example embodiment. For brevity sake, the elements of the cartridge 30 discussed above, are not again discussed here. The width of the high-efficiency filter 39 may be somewhat wider than a width of the cylindrical protrusion 36*b* of the nose 36 of the cartridge 30, in order for the filter 39 to cover the channel 33 that is partially defined by the cylindrical protrusion 36*b*. When the cartridge 30 is assembled, the PCB substrate 32 fits under the nose 36, such that the raised lip 36*a* of the nose 36 extends below a lower-surface of the PCB substrate 32, and extend below a lower-surface of the dispensing chip 41, so that the raised lip 36*a* protects the lower surfaces of the substrate 32 and chip 41 (as shown in FIG. 10).

FIG. 14 is an illustration of an exploded view of the e-vaping device 10 of FIGS. 1 and 3, in accordance with an example embodiment. For brevity sake, the elements of the device 10 discussed in relation to FIG. 3 (above) are not again discussed here. In an embodiment, the device 10 includes a relay board housing 50, where the housing 50 includes an opening 53. A proximal end 48*b* of the heater housing 48 may fit through the opening 53, in order to allow the proximal end 48*b* of the heater housing 48 to contact a distal end of the mouthpiece 14 when the device 10 is assembled. A cartridge housing seal (gasket) 51 is fitted around an outer periphery of the relay board housing 50, in order to allow the cartridge housing 16 to press up against the gasket 51, in order to provide a liquid-tight seal between the cartridge housing 16 and the relay board housing 50. The relay board housing 50 also includes a slot 55. The slot 55 accepts a distal end of the PCB interface 34 of the cartridge 30, when the cartridge 30 is installed within the cartridge housing 16. The relay board 56 includes the PCB edge female-connector 58, where the PCB edge female-connector 58 abuts the slot 55 of the relay board housing 50, thereby allowing the PCB interface 34 to fit within the PCB edge connector 58. The PCB edge connector 58 therefore firmly holds the PCB interface 34 of the cartridge 30, in order to retain the cartridge 30 against the relay board housing 50, when the cartridge 30 is installed within the cartridge housing 16.

A liquid port (orifice) 49 is defined by a top surface of the heater housing 48. The port 49 allows the cartridge 30 to discharge the pre-vapor formulation 21 onto the heater 40 within the heater housing 48. A distal end 48*a* of the heater housing 48 includes threads that are mateable with threads on an interior surface of a heater housing base 52. The heater connector 54 is insertable into the heater housing base 52, in order to allow a distal end of the heater holder 46 to contact and be retained within the heater connector 54. The heater connector 54 is electrically conductive in order to provide an electrical current from the heater power connector 64 to the heater holder 46 via electrical contacts 70. The electrical current from the heater holder 46 passes through the heater tongs 44 to the heater 40 in order to electrically activate heater 40, in order to allow the heater 40 to vaporize the pre-vapor formulation 21 (as described below in more detail).

Figure 15:
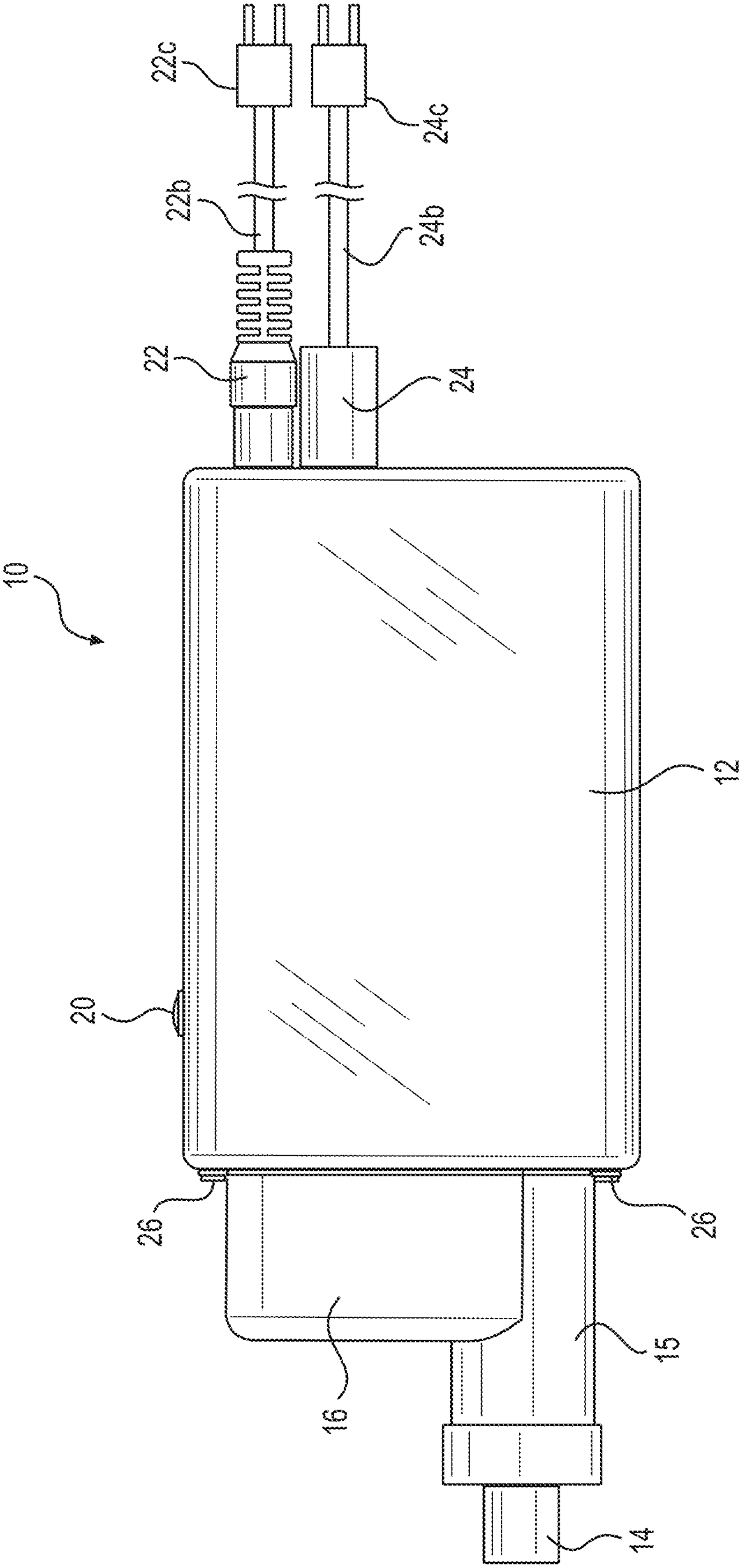
FIG. 15 is an illustration of another side view of the e-vaping device of FIG. 1, in accordance with an example embodiment.

FIG. 15 is an illustration of a side-view of the e-vaping device 10 of FIG. 1, in accordance with an example embodiment. Specifically, FIG. 15 depicts the general layout of the device 10, where the mouthpiece 14, the mouthpiece stack 15, and the cartridge housing 16 is positioned on one end of the device 10, and the two power inputs (power supply connector 22, and the USB connector 24) are on another end of the device 10.

Figure 16:
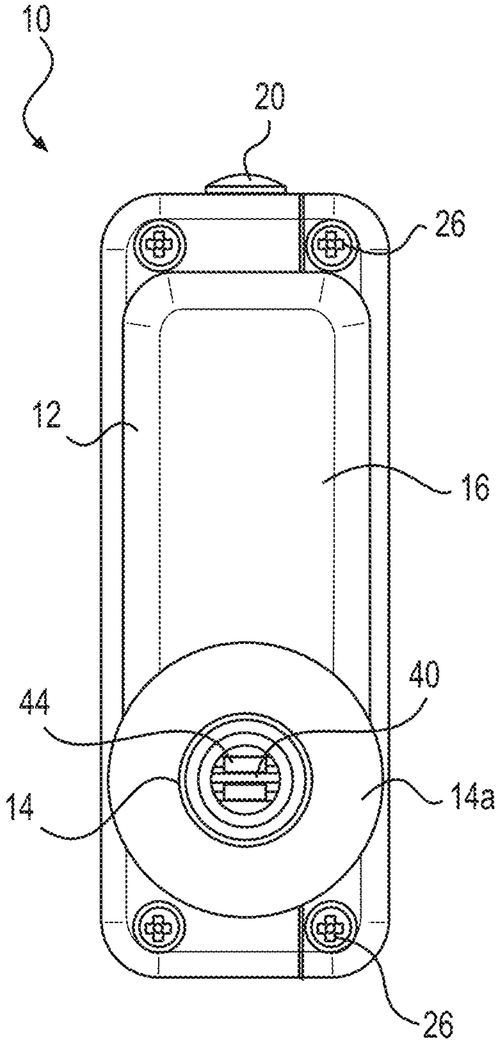
FIG. 16 is an illustration of a front view of the e-vaping device of FIG. 1, in accordance with an example embodiment.

FIG. 16 is an illustration of a front-view of the e-vaping device 10 of FIG. 1, in accordance with an example embodiment. Specifically, FIG. 16 illustrates a layout of the end of the device 10, where mouthpiece 14 emanates from a lower end of the cartridge housing 16. Mounting screws 26 may be used to connect the cartridge housing 16 to the housing 12 of the device 10.

Figure 17:
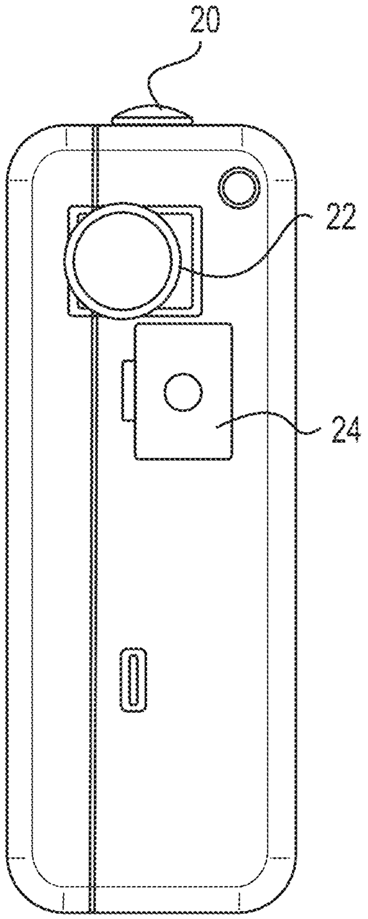
FIG. 17 is an illustration of a back view of the e-vaping device of FIG. 1, in accordance with an example embodiment.

FIG. 17 is an illustration of back-view of the e-vaping device 10 of FIG. 1, in accordance with an example embodiment. Specifically, FIG. 17 illustrates a layout of the other end of the device 10, where the power inputs (power supply connector 22, and USB connector 24) are positioned near a top of the end of the device 10.

Figure 18A:
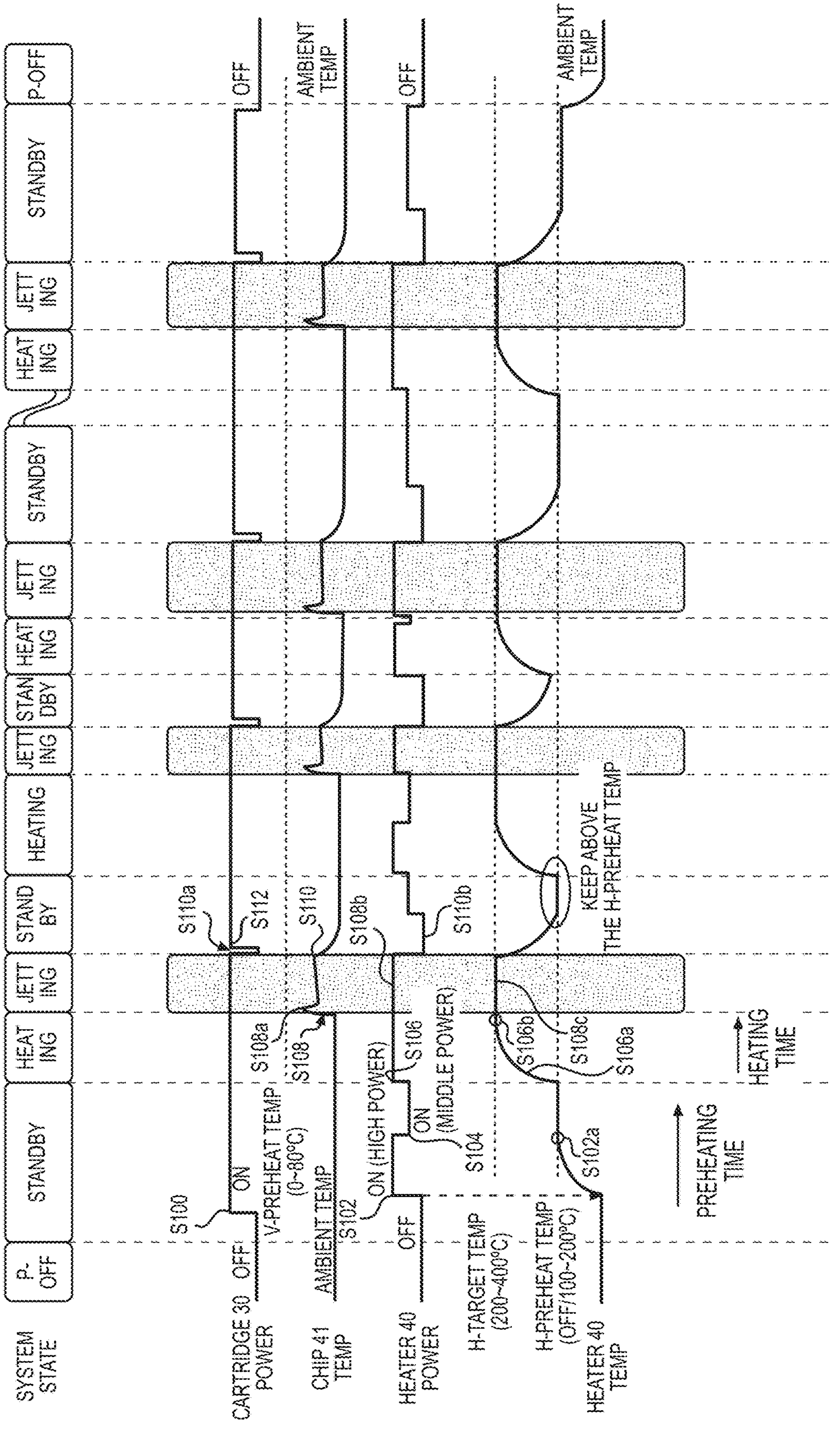
FIG. 18A is an illustration of a timing chart for an e-vaping device with a jet dispensing cartridge, in accordance with an example embodiment.

Operational Use of the E-Vaping Device:

FIG. 18A is an illustration of a timing chart for the e-vaping device 10 with the jet dispensing cartridge 30, in accordance with an example embodiment. While this timing chart is described (below) with regard to the device 10 of FIG. 1, it should be understood that the time chart, the discharge rates, temperatures, and other parameters described in association with FIG. 18, apply equally to the other e-vaping embodiments also described herein.

With regard to the timing chart of FIG. 18A, the device 10 is powered on by pressing the power switch 18, as shown in step S100. Once the device 10 is on, the device 10 is considered to be in a 'standby' mode. In the standby mode, the MCU 63/FPGA 68 causes an electrical current to be transmitted from the power supply 28 through the heater power connector 64, the heater connector 54 and the tongs 44 to the heater 40, whereupon the heater 40 is electrically energized at a 'high-power' setting for a 'pre-heating' period of about 3 to 5 seconds (in step S102).

Following the heater 40 'high-power' period, which occurs during the pre-heating of the heater 40, the heater 40 rises in temperature to a pre-heat temperature of about 100-200° C. (at step S102*a*), where this temperature is detected by the MCU 63. For instance, in an embodiment, the MCU 63 is configured to sense a magnitude of the electrical current that is sent to the heater 40 in order to measure a resistance of the heater 40, where the MCU 63 may include an internal lookup table that provides heater 40 temperature indexed by the resistance of the heater 40. Alternatively, any well-known temperature sensing method or sensor may be used. Following the initial 'high-power' period, the MCU 63 reduces the electrical current to the heater 40, such that the electrical current remains at a 'middle-power' range (in step S104). It should be understood that, because an actual duration of the 'standby' mode may vary, the MCU 63 continues to adjust the electrical current to the heater 40, by vacillating the heater 40 between the 'high-power' range and 'middle-power' range, in order to maintain a 'standby' (pre-heat) temperature of the heater 40 within the desired range of 100-200° C.

At step S106, the device 10 enters a 'heating' mode, where this mode may commence in one of two ways: 1) the heater switch 20 may be manually switched on, or 2) the sensor 80 may optionally sense an air flow through the device 10 that meets the 'vaping conditions' (described above). In particular, in the 'heating' mode, the MCU 63 increases the electrical current to the heater 40 due to the heater switch 20 being pressed, or optionally the MCU 63 increases the electrical current to the heater 40 due to the circuitry 82 notifying the MCU 63 that the sensor 80 has sensed an air flow traveling through the chimney 48 that meets the 'vaping conditions.' In the event the sensor 80 and circuitry 82 is used to commence the 'heating' mode, the sensor 80 is configured to assist in sensing the 'vaping conditions' (described above). Specifically, the sensor 80 generates an output indicative of a magnitude and a direction of the airflow, where the circuitry 82 receives the sensor 80 output, and determines if the 'vaping conditions' exist. If these internal 'vaping conditions' exist within the device 10, the circuitry 82 causes the MCU 63 to increase the current of electrical power from the power supply 28 to the heater 40.

Once the device 10 is in the 'heating' mode, the MCU 63 increases the flow of the electrical current from the power supply 28 to the heater 40 so that the heater is again at the 'high-power' setting (step S106*a*), which causes the heater 40 to increase in temperature from about 100-200° C. to a 'target jetting' temperature range of about 200-400° C. (in step S106*b*). The duration of time between commencement of the 'heating' mode, and commencement of a 'jetting' mode (described below), is about 3 to 5 seconds.

At step S108, the device 10 enters a 'jetting' mode. The 'jetting' mode commences due to the MCU 63 determining that the heater 40 has reached the target temperature of 200-400° C., whereupon the MCU 63 causes the power supply 28 to send an electrical current through the connectors 60/62, the relay board 56, the connector 58, and the PCB interface 34, in order to electrically energize the substrate heaters 41*d* within the cartridge 30 (at step S108*a*). In particular, the electrical current causes the control logic 41*e* of the cartridge 30 to energize the substrate heaters 41*d* to cause the chip 41 to reach a pre-heated temperature of about 50 to 80° C. (at step S108*a*), or preferable a pre-heated temperature of about 80° C., where this temperature helps reduce the effective viscosity of the pre-vapor formulation 21 that will be discharged during the 'jetting' mode. It should be understood that this reduction in the viscosity of the pre-vapor formulation 21, as the pre-vapor formulation comes into contact and passes through the vias 41*a* in the chip 41, helps control a precision in the quantity of the pre-vapor formulation 21 that is discharged onto the heater 40. Once the chip 41 reaches the 'pre-heat' temperature (as confirmed by the thermal control 41*f*), the control logic 41*e* of the dispensing chip 41 causes the cartridge 30 to dispense the pre-vapor formulation 21, throughout the remainder of the 'jetting mode.'

The discharging of the pre-vapor formulation 21 is accomplished by the control logic 41*e* causing successive pairs of ejection heaters 41*c*1 (where in an embodiment, up to a total of eight ejection heaters 41*c*1 on the chip 41 may be ejected at a time—meaning, in the embodiment up to four ejection heaters 41*c*1, for each via 41*a*, is energized at a time) to continuously eject drops of the pre-vapor formulation 21 through each of the ejectors 41*c*, until all of the ejectors 41*c* have discharged the formulation 21 for each via 41*a*. That is to say, the ejection heaters 41*c*1 can be energized individually, or in groups, such that each of the ejection heaters 41*c*1 of each via 41*a* are energized prior to an ejection sequence of the ejection heaters 41*c*1 being repeated (where the ejection sequence of the ejection heaters 41*c*1 is controlled by the control logic 41*e* in response to input signals from the MCU 63/FPGA 68).

Figure 18B:
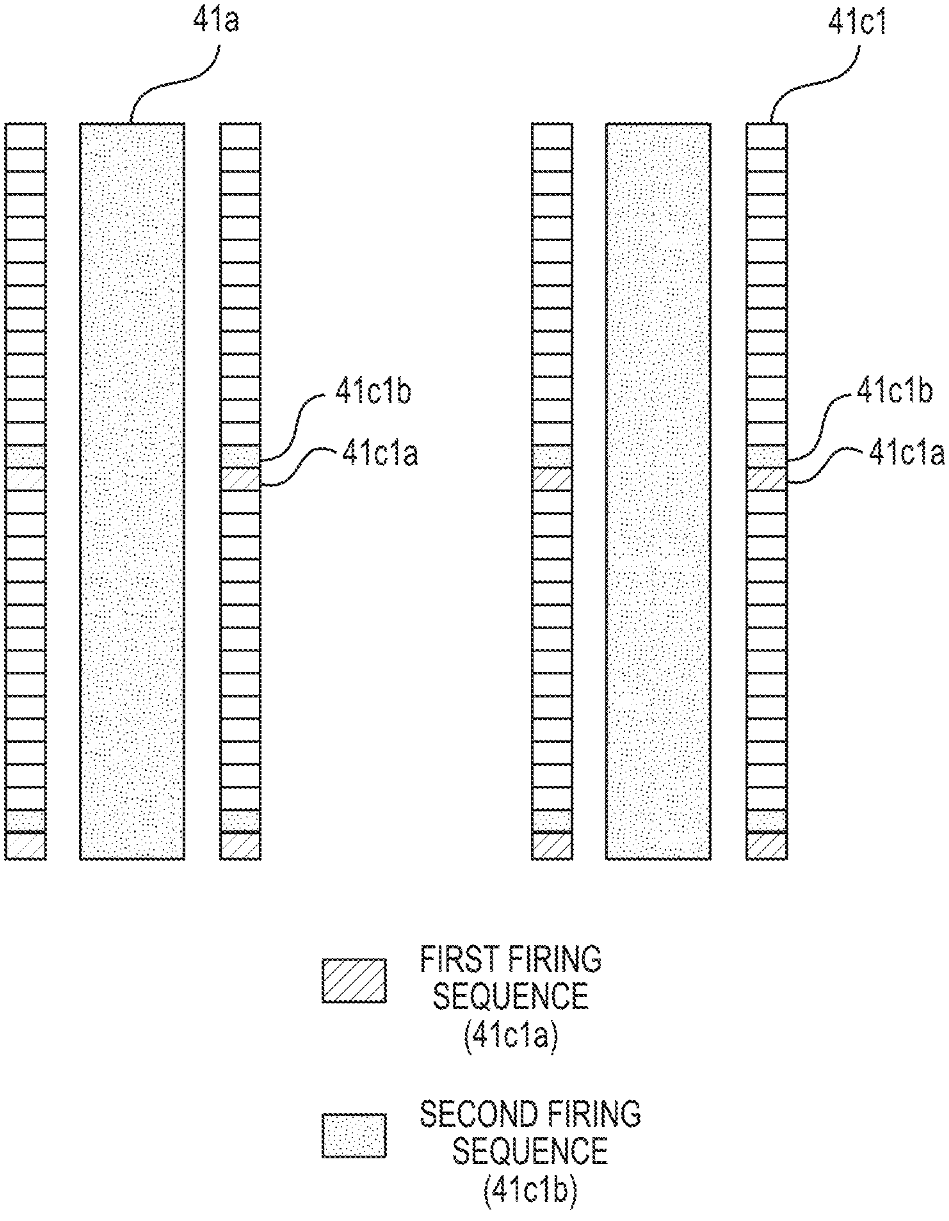
FIG. 18B is an illustration of an example of ejection heaters of the dispensing chip being energized in a successive order, in accordance with an example embodiment.

FIG. 18B is an illustration of an example of ejection heaters 41*c*1 of the dispensing chip 41 being energized in a successive order, in accordance with an example embodiment. In the example, two pairs of ejection heaters 41*c*1*a* are initially energized for each of the vias 41*a* (with a total of 8 ejection heaters 41*c*1 initially energizing in a first sequence), successively followed by another group of heaters 41*c*1*b* being energized directly after the initial ejection heaters 41*c*1*a* are energized. In an embodiment, the successive energizing of ejection heaters 41*c*1 continues until each of the ejection heaters 41*c*1 has discharged the formulation 21, whereupon the ejection heater 41*c*1 energizing sequence is repeated. The precise energization timing and activation sequence of the ejection heaters 41*c*1 may be accomplished using any well-known jet dispensing method.

Returning to FIG. 18A, during the duration of the 'jetting' mode, the MCU 63 continues to maintain the heater 40 at the 'high-power' setting (as shown in step S108*b*), which in turn causes the heater temperature to be maintained in the target range of about 200-400° C. (in step S108*c*). At this desired heater 40 temperature, the heater 40 is expected to vaporize the droplets of the pre-vapor formulation 21 that are on the heater 40, causing the droplets to be vaporized into vapor particles that are about 0.4 to 5 μm in diameter, or preferably about 1 μm in diameter.

In an embodiment, during the 'jetting' mode, the cartridge 30 ejects pre-vapor formulation 21 droplets (i.e., bubbles), where each droplet is in a range of 25 to 29 μm in diameter, or 8 to 13 ρL in volume, where these droplet sizes are larger than typical vapor particle sizes found in conventional e-vaping devices (where conventional devices, that do not use jet dispensing, often produce vapor particle sizes that are about 1 μm in diameter). In a single stream or jet, a larger droplet of the pre-vapor formulation 21 is trailed by a series of smaller droplets that successively decrease in size. That is to say, the jet droplets are not be dispensed continuously, but rather they are pulsed. In an embodiment, the pulsing or jetting frequency is in a range of 1 to 4 kHz, with approximately 31.25 μs between each of the jetted bubbles. In an embodiment, the average rate of pre-vapor formulation 21 discharge, throughout the 'jetting' mode, is in a range of about 0.5 to 3.5 μL/s (where this range represents the total formulation 21 being discharged by the dispensing chip 41 of the cartridge 30, assuming 128 ejectors 41*c* for the chip 41). A range of dispensing rates for each individual ejector 41*c* is also about 3.9 to 27.3 ρL/s. A vapor exit temperature for the ambient air and vapor being discharged through the mouthpiece 14 of the device 10, is about 40 to 50° C.

It should be understood that the amount of pre-vapor formulation 21 that is jetted can be impacted by the viscosity of the formulation 21, where the viscosity is dependent on the temperature of the dispensing chip 41 (which is maintained by the substrate heaters 41*d*), which is regulated by the thermal controller 41*f*. In particular, the thermal control 41*f* includes a temperature sensor or a temperature indicator that is configured to send a signal to the control logic 41*e* indicating the temperature of the chip 41, in order to maintain a closed control loop that is designed to ensure a desired substrate heater 41*d* temperature, and a precise and consistent amount of pre-vapor formulation 21 that is jetted even during times when the jet dispensing chip 41 becomes heated during normal and/or extended operation of the device 10.

Step S110 commences another 'standby' mode. In 'standby,' the device is again powered off (see step S110*a*), causing the MCU 63 to cut the electrical current to the heater 40 (see step S110*b*). In the event the device 10 is powered back on (step S112), the steps (S100 though S108) is repeated again, in order to cause the device 10 to discharge and vaporize more of the pre-vapor formulation 21 from the cartridge 30.

In an embodiment, the USB connector 24 is used to allow an adult vaper to adjust parameters of the device 10, by adjusting the programming of the MCU 63/FPGA 68. These adjustable parameters include, for instance, an ejection frequency, a pulse duration, a system voltage, a pre-heat temperature, a vaporizing temperature, etc. In an embodiment, the programming adjustments to the MCU 63/FPGA 68 is accomplished through the use of a mobile device or a computer (not shown), that interfaces with the MCU 63/FPGA 68 via the connector 24, in order to alter these parameters within selectable ranges.

Additional Performance Data for the E-Vaping Device:

The device 10 of FIG. 1 (as well as the other disclosed devices, described below), has an overall resistance-to-draw (RTD) of about 30 to 45 inches of water. In an embodiment, the power supply 28 has a useful life of approximately 1200 puffs, prior to the power supply 28 either being recharged or replaced. In an embodiment, an expected vapor production is about 6-16 mg per puff (where each puff duration lasts about 5 seconds), with an expected pre-vapor formulation 21 delivery rate being about 0.5-4.0 μL per second for the device 10.

Additional Structural Embodiments

Figure 19A:
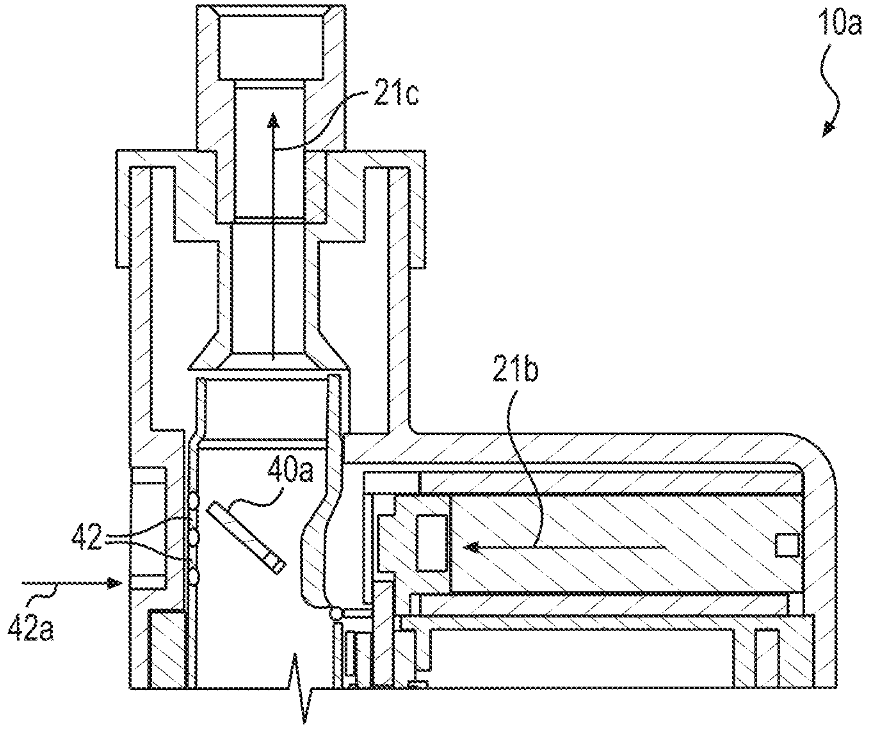
FIG. 19A is an illustration of a cross-sectional view of an alternative embodiment of the device shown in FIG. 3, in accordance with an example embodiment.

FIG. 19A is an illustration of a cross-sectional view of an alternative embodiment of the device 10 shown in FIG. 3, in accordance with an example embodiment. In an embodiment, the device 10*a* in FIG. 19A includes a heater 40*a* that is oriented in a somewhat different position from the device 10 shown in FIG. 3. In particular, the heater 40*a* has major surfaces that are not perpendicular to an incoming stream of jetted pre-vapor formulation 21*b* and/or an incoming stream of inlet air 42*a* (passing through vent holes 42). In an embodiment, the heater 40*a* has major surfaces that are at an angle of about 45 degrees, relative to the incoming stream of jetted pre-vapor formulation 21*b* and/or an incoming stream of inlet air 42*a*. The entrained vapor 21*c* leaving the heater 40*a* also travels at an angle that is about 45 degrees relative to the major (top and bottom) surfaces of the heater 40*a*. In another embodiment, the heater 40*a* is oriented so that the major surfaces of the heater 40*a* are at an angle that is something other than perpendicular (as shown in FIG. 3) or 45 degrees (as shown in FIG. 19A) to the jetted pre-vapor formulation 21*b* and/or entrained vapor 21*c*.

Figure 19B:
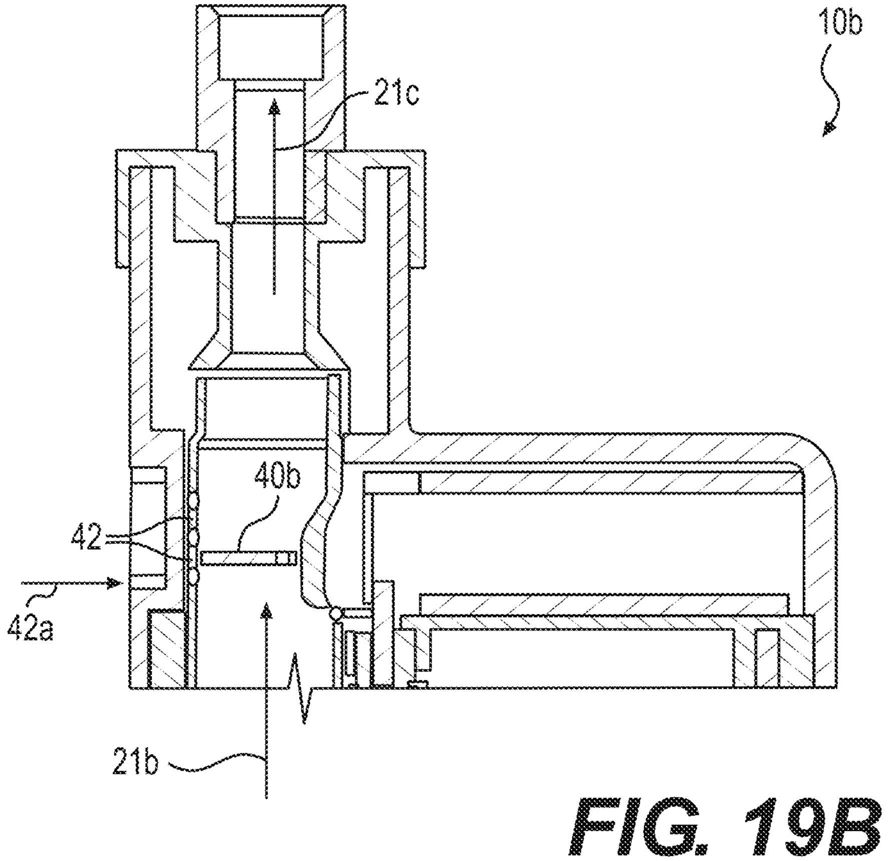
FIG. 19B is an illustration of a cross-sectional view of another alternative embodiment of the device shown in FIG. 3, in accordance with an example embodiment.

FIG. 19B is an illustration of a cross-sectional view of another alternative embodiment of the device 10 shown in FIG. 3, in accordance with an example embodiment. In an embodiment, the device 10*b* includes a heater 40*b* that is oriented in a somewhat different position from the device 10 shown in FIG. 3. In particular, the heater 40*b* has major surfaces that are about parallel to an incoming stream of jetted pre-vapor formulation 21*b* and/or an incoming stream of inlet air 42*a* (passing through vent holes 42). The entrained vapor 21*c* leaving the heater 40*a* travels at an angle that is about perpendicular to the major (top and bottom) surfaces of the heater 40*b*.

FIG. 20 is an illustration of another alternative embodiment of a cartridge 30*a* for an e-vaping device, in accordance with an example embodiment. In this embodiment, the nose 36 and dispensing chip 41 may be separated from the housing 31 of the cartridge 30*a*. In such an embodiment, the dispensing chip 41 (on substrate 32) can therefore be permanently or semi-permanently retained within the e-vaping device, while the cartridge 30*a* is replaceable and/or rechargeable. By separating the dispensing chip 41 from the nose 36 and the cartridge 30*a*, an overall cost of an e-vaping device is lower, as this embodiment reduces an overall number of dispensing chips 41 that need to be produced and consumed during a useful life of the e-vaping device.

In an embodiment, the nose 36 and the dispensing chip 41 is permanently retained within the e-vaping device in such an orientation that the nose 36 and the chip 41 contacts a bottom of the cartridge 30*a* when the cartridge 30*a* is inserted into and mounted within the e-vaping device. Once the cartridge 30*a* is mounted within the device, the nose 36 of the cartridge 30*a* ensures a proper orientation of the dispensing chip 41 relative to the cartridge housing 31. Once the nose 36 and the chip 41 are connected to the housing 31 of the cartridge 30*a*, the cartridge 30*a* and the dispensing chip 41 performs jetting functions in the same manner that is described above (in relation to the discussion of FIGS. 18A and 18B describing the operational functions of the cartridge 30).

In an embodiment, the construction of the cartridge 30*a*, and the separation of the nose 36 and chip 41 from the cartridge housing 31 (i.e., a 'two-piece construction' of a cartridge), can be made according to the disclosure of the "Supply Item for Vapor Generating Device," U.S. application Ser. No. 15/336,863, filed on Oct. 28, 2016, the entire contents of which is hereby incorporated by reference in its entirety into this document.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of making an e-vaping device, comprising:

providing a reservoir within a housing, the reservoir being configured to contain a pre-vapor formulation;

first configuring ejectors to eject droplets of the pre-vapor formulation towards a vaporizing heater, the ejectors being in fluid communication with the reservoir; and second configuring a vaporizing heater to vaporize at least some of the droplets.

2. The method of claim 1, wherein the first configuring configures the ejectors to be an array of ejectors positioned in a matrix.

3. The method of claim 1, wherein the first configuring configures a chip with at least one via in fluid communication with the reservoir, the chip including the ejectors.

4. The method of claim 3, wherein the first configuring configures at least one substrate heater to heat the chip.

5. The method of claim 4, wherein the first configuring and the second configuring configures a power supply and control circuitry to be operationally connected to the ejectors, the vaporizing heater and the at least one substrate heater in order to energize the vaporizing heater, energize the at least one substrate heater to heat the chip to a first temperature, and energize at least one of the ejectors to eject the droplets toward the vaporizing heater, once the chip reaches the first temperature.

6. The method of claim 1, wherein the first configuring and the second configuring operationally connects control circuitry and a power supply to the vaporizing heater and the ejectors in order to first energize the vaporizing heater to heat the vaporizing heater to a first temperature, the first temperature being a pre-heat temperature, and second energize the vaporizing heater to heat the vaporizing heater to a second temperature, the second temperature being a target jetting temperature, and energize at least one of the ejectors once the vaporizing heater reaches the second temperature.

7. The method of claim 1, wherein the first configuring and the second configuring operationally connects control circuitry and a power supply to the vaporizing heater and the ejectors in order to first energize the vaporizing heater to heat the vaporizing heater to a first temperature, the first temperature being a pre-heat temperature of 100-200° C., and second energize the vaporizing heater to heat the vaporizing heater to a second temperature, the second temperature being a target jetting temperature of 200-400° C., and energize at least one of the ejectors once the vaporizing heater reaches the second temperature.

8. The method of claim 1, wherein the first configuring and the second configuring operationally connects control circuitry and a power supply to the vaporizing heater, the ejectors and at least one substrate heater in order to energize the at least one substrate heater on a substrate to heat the substrate to a first temperature, the ejectors being on the substrate, energize the vaporizing heater to heat the vaporizing heater to a second temperature, and energize at least one of the ejectors once the substrate reaches the first temperature and the vaporizing heater reaches the second temperature.

9. The method of claim 1, further comprising:

third configuring a cartridge to be selectively removable from the housing, the cartridge defining the reservoir.

10. The method of claim 9, wherein the third configuring configures a chip on a first end of the cartridge, the chip defining at least one via in fluid communication with the reservoir, the chip including the ejectors.

11. The method of claim 10, wherein the third configuring configures the chip to be separable from the first end of the cartridge, the e-vaping device being structured to retain the chip if the cartridge is removed from the housing.

12. The method of claim 1, wherein the first configuring configures the ejectors so that each one of the ejectors includes a nozzle defined at least in part by a surface on a chip, a chamber defined at least in part by the chip, the chamber being in fluid communication with the nozzle and at least one via, an ejection heater on a surface of the chamber, the ejection heater being configured to heat and partially vaporize the pre-vapor formulation to form the droplets that are ejected through the nozzle and towards the vaporizing heater.

13. The method of claim 12, wherein the first configuring configures the ejectors so that the at least one via includes a first via and a second via defined at least in part by the chip, the ejectors being an array of ejectors in a matrix that are positioned adjacent to at least one of the first via and the second via.

14. The method of claim 1, wherein the first configuring configures a chip with at least one via in fluid communication with the reservoir, configures the chip to include at least one substrate heater, and configures the ejectors to be on the chip, the at least one substrate heater being configured to heat the chip to a temperature that is 50 to 80° C. prior to the ejectors ejecting the droplets.

15. The method of claim 1, wherein the first configuring and the second configuring configures the ejectors and the vaporizing heater to eject the droplets of the pre-vapor formulation and vaporize at least some of the droplets, where the pre-vapor formulation has a viscosity of 40 cP to 100 cP prior to being ejected and heated.

16. The method of claim 15, wherein the first configuring configures a chip with at least one via in fluid communication with the reservoir, configures the chip to includes at least one substrate heater, and configures the ejectors to be on the chip, the at least one substrate heater being configured to heat the chip to a temperature that is 50 to 80° C. prior to the ejectors ejecting the droplets.

17. The method of claim 1, wherein the second configuring configures the vaporizing heater to be suspended in an airflow passageway near a discharge end of the ejectors.

18. The method of claim 17, wherein the second configuring configures the vaporizing heater with a major surface, the major surface being transverse to a discharge direction of ejectors.

19. The method of claim 1, wherein the first configuring configures the ejectors to eject the droplets with a droplet size that is 25 to 29 μm in diameter.

20. The method of claim 1, wherein the first configuring configures the ejectors to eject the droplets of the pre-vapor formulation with a droplet size that is 25 to 29 μm in diameter, and the first configuring and the second configuring configures the e-vaping device to produce vapor at a production rate of 6 to 16 mg per puff for a puff duration of 5 seconds with a vapor particle size of 0.4 to 5 μm in diameter.

* * * * *